(12) United States Patent
Koorapaty et al.

(10) Patent No.: US 9,900,131 B2
(45) Date of Patent: Feb. 20, 2018

(54) FLEXIBLE TRANSMISSION OF MESSAGES IN A WIRELESS COMMUNICATION SYSTEM WITH MULTIPLE TRANSMIT ANTENNAS

(75) Inventors: Havish Koorapaty, Saratoga, CA (US); Robert Baldemair, Solna (SE); Jung-Fu Cheng, Fremont, CA (US); Mattias Frenne, Uppsala (SE); Daniel Larsson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 13/430,865

(22) Filed: Mar. 27, 2012

(65) Prior Publication Data

US 2013/0044701 A1 Feb. 21, 2013

Related U.S. Application Data

(60) Provisional application No. 61/523,641, filed on Aug. 15, 2011.

(51) Int. Cl.
*H04W 28/26* (2009.01)
*H04B 7/005* (2006.01)
(Continued)

(52) U.S. Cl.
CPC ........ *H04L 5/0048* (2013.01); *H04L 27/2611* (2013.01)

(58) Field of Classification Search
CPC ... H04L 5/0048; H04L 27/2611; H04W 28/00
(Continued)

(56) References Cited

U.S. PATENT DOCUMENTS 7,577,165 B1 * 8/2009 Barrett .......................... 370/477
8,498,254 B2 * 7/2013 Dai et al. ...................... 370/329
(Continued)

FOREIGN PATENT DOCUMENTS

CN 101610104 A 12/2009
WO 2010090415 A2 8/2010
(Continued)

OTHER PUBLICATIONS

Japanese Office Action with English Translation dated Jul. 5, 2016, issued in Japanese Patent Application No. 2014-525550, 6 pages.
(Continued)

*Primary Examiner* — Marsha D. Banks Harold
*Assistant Examiner* — Camquyen Thai
(74) *Attorney, Agent, or Firm* — Rothwell, Figg, Ernst & Manbeck, P.C.

(57) ABSTRACT

Devices and methods for transmitting information in resource blocks between a base station and one or more communication devices are disclosed. In each resource block (RB) used for a data or control channel transmission, a plurality of non-overlapping regions of resource elements (REs) are defined. Each region is associated with one or multiple unique reference symbols (RSs), and may be further associated with one or more antenna ports. When user equipment (UE) demodulates the information it receives in a particular region of an RB, it uses the RS and/or antenna port associated with that region. The RS and/or antenna port information may be used, for example, to estimate a channel of the communication network or to demodulate and decode the data contained within the associated regions.

29 Claims, 21 Drawing Sheets

(51) Int. Cl.
*H04L 5/00* (2006.01)
*H04L 27/26* (2006.01)

(58) Field of Classification Search
USPC ....... 370/328, 329, 341, 343, 315, 208, 477, 370/330, 478, 280; 375/267
See application file for complete search history.

(56) References Cited

U.S. PATENT DOCUMENTS

| | | | |
|---|---|---|---|
| 2009/0147877 A1* | 6/2009 | Connors | H04L 1/0084 375/267 |
| 2010/0054161 A1* | 3/2010 | Montojo | H04W 72/042 370/280 |
| 2010/0239034 A1* | 9/2010 | Lee et al. | 375/260 |
| 2011/0026631 A1* | 2/2011 | Zhang | H04B 7/0613 375/267 |
| 2011/0096717 A1* | 4/2011 | Kim et al. | 370/315 |
| 2011/0170496 A1 | 7/2011 | Fong et al. | |
| 2011/0176634 A1 | 7/2011 | Yoon et al. | |
| 2011/0188460 A1* | 8/2011 | Malladi | H04W 52/146 370/329 |
| 2011/0235599 A1* | 9/2011 | Nam et al. | 370/329 |
| 2011/0261768 A1* | 10/2011 | Luo | H04L 5/001 370/329 |
| 2011/0268046 A1* | 11/2011 | Choi et al. | 370/329 |
| 2011/0268072 A1* | 11/2011 | Lee et al. | 370/329 |
| 2012/0014320 A1* | 1/2012 | Nam et al. | 370/328 |
| 2012/0033643 A1* | 2/2012 | Noh et al. | 370/335 |
| 2012/0243500 A1* | 9/2012 | Chandrasekhar et al. | 370/330 |
| 2012/0263117 A1* | 10/2012 | Love et al. | 370/329 |
| 2012/0281640 A1* | 11/2012 | Xu | H04L 5/0048 370/329 |
| 2013/0003604 A1* | 1/2013 | Blankenship et al. | 370/255 |
| 2013/0129018 A1* | 5/2013 | Ko et al. | 375/296 |

FOREIGN PATENT DOCUMENTS

| | | |
|---|---|---|
| WO | WO 2011016835 A1 * | 2/2011 |
| WO | 2011041623 A1 | 4/2011 |
| WO | WO 2011079454 A1 * | 7/2011 |
| WO | 2013024434 A1 | 2/2013 |

OTHER PUBLICATIONS

Chinese Office Action dated May 5, 2016, issued in Chinese Patent Application No. 201280050720.8, 26 pages.
International Preliminary Report on Patentability, in corresponding International Application No. PCT/IB2012/054141, dated Feb. 18, 2014, 7 pages.
Notification of Transmittal of the International Search Report and Written Opinion of the International Searching Authority, or Declaration, for International application No. PCT/IB2012/054141, dated Dec. 7, 2012, 13 pages.
Dahlman et al., 4G LTE/LTE-Advanced for Mobile Broadband, Mar. 2011, Academic Press Elsevier, 447 pages.
Non-final Office Action U.S. Appl. No. 13/494,040, dated Dec. 6, 2013, 22 pages.
International Search Report for International application No. PCT/IB2012/054148, dated Dec. 7, 2012, 3 pages.
Third Chinese Office Action issued in Application No. 201280050720.8 dated Aug. 3, 2017, with English Summary Translation, 4 pages.

* cited by examiner

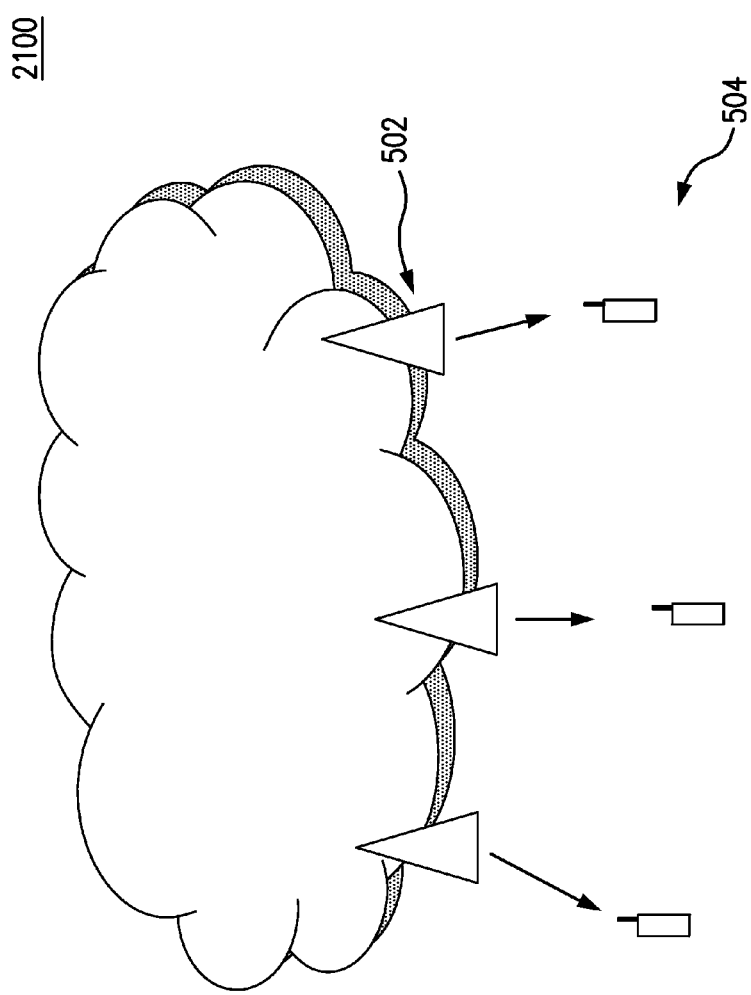

FLEXIBLE TRANSMISSION OF MESSAGES IN A WIRELESS COMMUNICATION SYSTEM WITH MULTIPLE TRANSMIT ANTENNAS

CROSS-REFERENCE TO RELATED APPLICATIONS

The present application claims priority benefit under 35 U.S.C. § 119(e) of U.S. Provisional Patent Application No. 61/523,641, entitled "Flexible Transmission Of Messages In A Wireless Communication System With Multiple Transmit Antennas," filed Aug. 15, 2011, the contents of which are incorporated herein by reference in their entirety.

TECHNICAL FIELD

The present invention relates generally to telecommunication networks, and more particularly, to a method and device for transmitting data in a wireless communication network with multiple transmit antennas.

BACKGROUND

3GPP Long Term Evolution (LTE) is a standard for mobile phone network technology. LTE is a set of enhancements to the Universal Mobile Telecommunications System (UMTS), and is a technology for realizing high-speed packet-based communication that can reach high data rates on both downlink and uplink channels. In LTE, transmissions are sent from base stations, such as Node Bs (NBs) and evolved Node Bs (eNBs), to mobile stations (e.g., user equipment (UE)). These transmissions are sent using orthogonal frequency division multiplexing (OFDM), which splits the signal into multiple parallel sub-carriers in frequency.

As illustrated in FIG. 1, the basic unit of a transmission in LTE is a resource block (RB) 100, which in its most common configuration consists of 12 sub-carriers 104 and 7 OFDM symbols 108 (i.e., one slot). An OFDM symbol 108 may include a cyclic prefix 106. A unit of one sub-carrier and one OFDM symbol is referred to as a resource element (RE) 102. Thus, an RB may consist of, for example, 84 REs in a 12×7 configuration.

An LTE radio sub-frame may be composed of multiple resource blocks in frequency and two slots in time, with the number of RBs determining the bandwidth of the system. Two RBs in a sub-frame, that are adjacent in time, for instance as shown in FIG. 3, may be referred to as an RB pair 300. In the time domain, an LTE downlink transmission may be organized into radio frames of 10 ms, each radio frame consisting of ten equally-sized sub-frames of length $T_{sub-frame}$=1 ms.

LTE may be deployed in a number of configurations such as Multiple-Input, Multiple-Output (MIMO) radio systems. An exemplary MIMO system including a base station 502, such as an eNB, and user equipment 504 is shown in FIG. 5. When a signal is transmitted by the eNB 502 in a downlink, i.e., the link carrying transmissions from the eNB to the UE 504, a sub-frame may be transmitted from multiple antennas 506,508 and the signal may be received at a UE 504, which has one or more antennas. The radio channel distorts the transmitted signals from the multiple antenna ports.

Due to the multiple paths and conditions on each channel, in order to demodulate a transmission on the downlink, the UE 504 relies on reference symbols (RS) that are also transmitted on the downlink. An RS may be understood as one or more REs carrying pre-defined symbols. These reference symbols and their position in the time-frequency grid are known, or otherwise determined, by the UE. Thus, the RSs can be used to determine channel estimates by measuring the effect of a specific radio channel on these symbols.

According to the LTE standard, transmissions from an eNB are sent from "antenna ports" rather than antennas. An antenna port may be understood as a virtual antenna, which can further be associated with a reference symbol RS. Thus, when a UE measures the channel from an antenna port to the receiver antenna, which physical antenna elements were used for the transmission is irrelevant for the UE. The transmission on an antenna port may originate from a single physical antenna element or may be the combination of signals from multiple antenna elements.

In certain instances, the use of transmit pre-coding can be used to direct transmitted energy towards a specific receiving UE. This may be accomplished by using all available antenna elements to transmit the same message, with different phase and/or amplitude weights applied at each antenna element. Since the reference symbol associated with each antenna port also undergoes the same pre-coding operation with identical pre-coding weights as the data, the transmission uses a single virtual antenna/single antenna port, and the UE need only perform channel estimation using a single RS.

There are several broad types of RSs used in LTE. A first type of RS is one that can be used by all UEs, and thus, have wide cell area coverage. One example of this type of reference symbol is the common reference symbol (CRS) that is used by UEs for various purposes, including channel estimation. Presently, these CRSs are defined so that they occupy certain pre-defined REs within the transmission sub-frame, regardless of whether there is any data being sent to users or not. For example, as shown in FIG. 2, a sub-frame 200 may include a control region, control signaling, and reference symbols 202. Reference symbols 202 may be a CRS used by a UE in the communication network.

A second type of RS is a UE-specific reference symbol, which is intended specifically for use by only a certain UE or set of UEs. Presently, these UE-specific RSs are transmitted only when data is transmitted to a certain UE. When pre-coded for a specific UE or set of UEs, the RS does not reach all parts of the cell, but only those parts of the cell where the UEs of interest (to which the data in intended) are located.

In LTE, UE-specific reference symbols are included as part of the resource blocks that are allocated to a UE for reception of user data. The exemplary use of UE-specific RSs in LTE is shown in the RB pair of FIG. 3, which includes UE-specific RSs $R_7$ and $R_9$.

Further, messages transmitted over a radio link to UEs in an LTE network can be broadly classified as control messages or data messages. Control messages are used to facilitate the proper operation of the system as well as proper operation of each UE within the system. Control messages could include, for example, commands to control functions such as transmitted power or additional signaling with RBs. Examples of control messages include, but are not limited to, the physical control format indicator channel (PCFICH) which carries configuration information of the control region size; the physical downlink control channel (PDCCH) which, for example, carries scheduling information and power control messages; the physical HARQ indicator channel (PHICH), which carries ACK/NACK in response to a previous uplink transmission; and the physical broadcast channel (PBCH), which carries system information.

In LTE Rel-10, control messages are demodulated using the CRS. The first one to four OFDM symbols, depending on the configuration, in a sub-frame are reserved for control information, for instance as shown in FIG. 2. Control messages of PDCCH type are transmitted in multiples of units called control channel elements (CCEs), where each CCE contains 36 REs.

Presently, data messages may be transmitted to users in RBs, which carry UE-specific RSs. These RSs may be used by the UEs to demodulate the data messages. The use of UE-specific RSs allows a multi-antenna eNB to optimize the transmission using pre-coding of signals being transmitted from the multiple antennas so that the received signal becomes stronger at the UE and consequently, the data rate of the transmission can be increased.

Similarly, Rel-10 of LTE also defines a control channel called the R-PDCCH for transmitting control information to relay nodes. The relay node receiving the R-PDCCH can use relay node (RN) specific reference signals to improve link performance. Adoption of the same principle of transmission as for the R-PDCCH has been considered by allowing the transmission of generic control messages to a UE using such transmissions based on UE-specific RSs.

Control messages could be categorized into those types of messages that need to be sent only to one UE (UE-specific control) and those that need to be sent to all UEs or some subset of UEs (common control) within the cell covered by the eNB. In the R-PDCCH, RN-specific messages are demodulated using RN-specific RS, whereas common control messages are demodulated using the CRS. The use of CRS has certain disadvantages. First, since CRS density is high within each RB (see FIG. 2), and each antenna requires its own CRS, orthogonal to the CRS of the other antenna ports, the overhead generated by the CRS can be quite high depending on the number of antennas used for transmission (roughly 9.5% for 2 antenna port transmission). Second, the transmission of CRS does not scale with the amount of user data being transmitted in the system. Thus, the mandatory transmission of CRS leads to an energy inefficient system, especially since they must be always on, even if there is no data transmission. Recent analyses have shown that a vast majority of sub-frames transmitted in an LTE system have no data or control messages transmitted in them.

Since common control signals are intended to be reached by all UEs in the cell, a wide coverage of the transmit radiation pattern must be used. Therefore, they are transmitted using either a single port transmission or using transmit diversity. Existing systems send messages that are common to multiple UEs by a wide cell coverage transmission format that requires channel estimation using the CRS. Transmission of reference signals such as the CRS that do not scale with the volume of control messages being sent is energy inefficient and also has impacts on performance due to the additional overhead accrued. Existing systems also do not provide a single unifying transmission scheme for both common control and UE-specific control messages.

A further problem exists regarding how to transmit common control signals with wide area coverage while utilizing multiple antenna ports for antenna diversity to enhance the robustness of the control channel, which is of paramount importance for stable system operation.

Another problem with existing systems is a lack of flexibility in the eNB to either transmit UE-specific control messages using UE-specific reference symbols so that these transmissions can be pre-coded to optimize the transmission for the UE, while at the same time using the same type of RS to transmit common control messages to a larger group of UEs or UE-specific control messages to a UE. Therefore, a problem exists regarding how to allow a eNB to seamlessly transition between sending control messages that are common to multiple UEs and that are specific to a UE, while minimizing the changes to eNB and UE operations.

Accordingly, there is a need for a method and device for improving transmission techniques from a base station with multiple antenna ports to a UE, using UE-specific reference symbols.

SUMMARY

Particular embodiments of the present invention are directed to devices and methods for transmitting and receiving data in a wireless communications network using resource blocks that include a plurality of regions associated with one or more reference symbols and antenna ports.

According to certain aspects of the disclosed devices and methods, information is transmitted in resource blocks (RBs) between a base station and one or more communication devices. In each RB used for a data or control channel transmission, a plurality of non-overlapping regions of resource elements (REs) are defined. Each region is associated with one or multiple unique reference symbols (RSs), and may be further associated with one or more antenna ports. When user equipment (UE) demodulates the information it receives in a particular region of an RB, it uses the RS and/or antenna port associated with that region. The RS and/or antenna port information may be used, for example, to estimate a channel of the communication network or to demodulate and decode the data contained within the associated regions.

In one particular aspect, a method is provided for transmitting data in a resource block from a base station to a communication device, where the base station includes a plurality of antenna ports and the transmitted resource block includes a plurality of regions made up of resource elements. The method includes allocating a first portion of the data to a first region of the resource block and allocating a second portion of the data to a second region of the resource block, where the first and second reference symbols are associated with the first and second regions. Also, the first reference symbol is associated with a first antenna port of the base station and the second reference symbol is associated with a second antenna port of the base station. The method further includes encoding the first portion of data to generate first encoded data and encoding the second portion of the data to generate second encoded data. The encoded data is modulated to generate first and second modulated data, which is transmitted in the resource block, along with the reference symbols, to the communication device.

Particular embodiments of the present invention provide a base station device operable in a communication network for transmitting data in a resource block, where the resource block includes a plurality of regions made up of resource elements. The base station includes a plurality of antenna ports and a processor configured to allocate a first portion of the data to a first region of the resource block, which is associated with a first reference symbol. The processor is also configured to allocate a second portion of the data to a second region of the resource block, which is associated with a second reference symbol. The processor is further configured to encode the first and second portions of data to generate encoded data. The encoded data is then modulated by the processor to generate first and second modulated data, which is transmitted by a transmitter configured to transmit the modulated data in a resource block along with the first and second reference symbols. The first reference symbol is associated with a first antenna port and the second reference symbol is associated with a second antenna port. Further, the first modulated data may be transmitted with the first reference symbol on the first antenna port and the second modulated data may be transmitted with the second reference symbol on the second antenna port.

Particular embodiments of the present invention provide a method for demodulating data in a resource block that includes a plurality of regions comprising resource elements. The method includes receiving the data at a communication device from a base station having a plurality of antenna ports, where a first portion of the data has been allocated to a first region of the resource block and associated with a first reference symbol and a second portion of the data has been allocated to a second region of the resource block and associated with a second reference symbol. The method also includes estimating a first channel corresponding to a first antenna port using the first reference symbol and estimating a second channel corresponding to a second antenna port using the second reference symbol. Finally, the method includes demodulating at least one of the first or second data portions.

Particular embodiments of the present invention provide a communication device operable in a communication network to receive data in a resource block, which includes a plurality of regions made up of resource elements. The data is received from a base station with a plurality of antenna ports, where a first portion of the data has been allocated to a first region of the resource block and associated with a first reference symbol, while a second portion of the data has allocated to a second region of the resource block and associated with a second reference symbol. The communication device includes one or more antennas configured to receive the data, and a processor coupled to the antennas. The processor is configured to estimate a first channel of the communication network corresponding to a first antenna port using the first reference symbol and estimate a second channel of the communication network corresponding to a second antenna port using the second reference symbol. The processor is also configured to demodulate at least one of the first or second portions of data.

Particular embodiments of the disclosed invention are directed to a method for transmitting a plurality of messages to one or more communication devices from a base station with a plurality of antenna ports. The method includes allocating a first message to a region of a first resource block, which comprises resource elements associated with a first reference symbol; allocating a second message to a region of a second resource block, which comprises resource elements associated with a second reference symbol; encoding the first and second messages to generate encoded data; modulating the encoded data to generate first and second modulated data; and transmitting the first and second modulated data, along with the first and second reference symbols, to at least one communication device.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 21 illustrates an exemplary wireless communication network in accordance with exemplary embodiments of the present invention.

DETAILED DESCRIPTION

In exemplary embodiments of the disclosed devices and methods, data is transmitted in resource blocks (RBs) between a base station with multiple antenna ports and one or more communication devices.

FIG. 21 illustrates an example wireless network 2100. As shown, wireless network 2100 includes at least one base station 502 and at least one wireless user equipment (UE) communication device 504. Examples of wireless UE communication devices include mobile telephones, personal digital assistants, electronic readers, portable electronic tablets, personal computers, and laptop computers.

Figure 6:
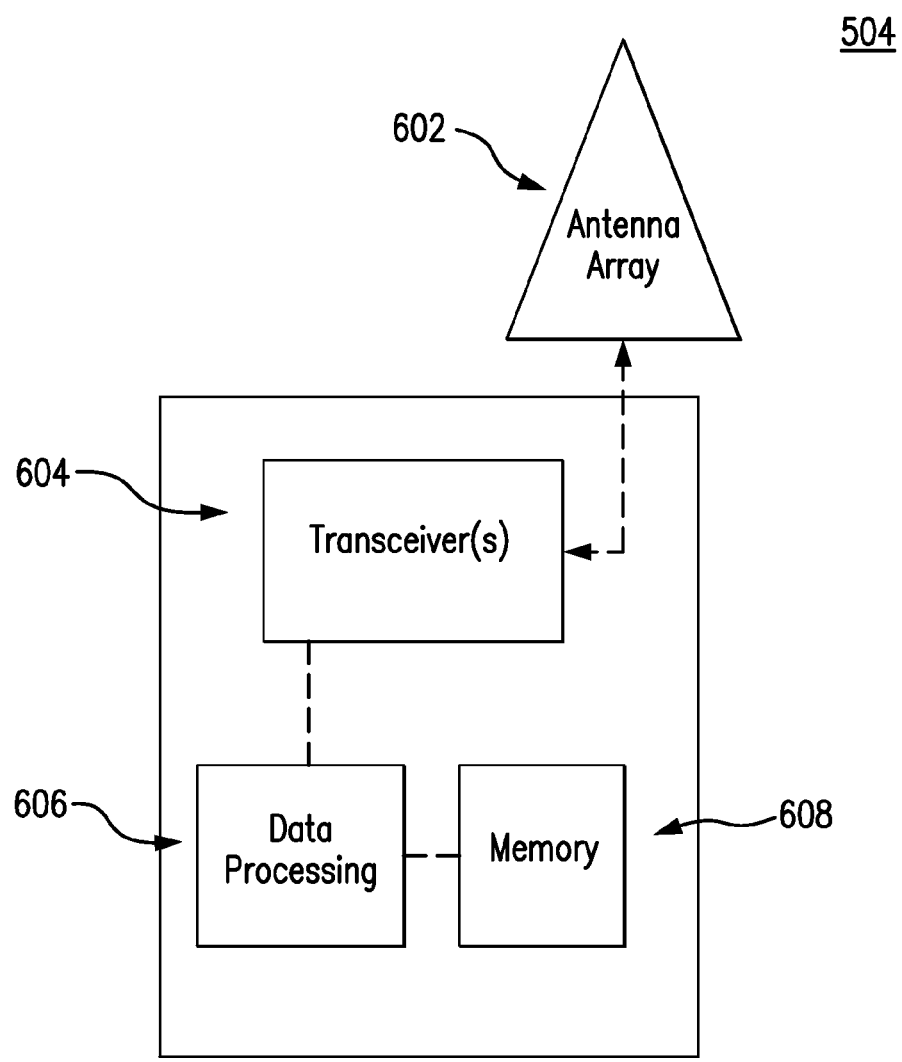
FIG. 6 is a block diagram of a UE communication device in accordance with exemplary embodiments of the present invention.

FIG. 6 illustrates a block diagram of an exemplary UE communication device 504. As shown in FIG. 6, the UE communication device may include: an antenna array 602, which includes one or more antennas, a data processing system 606, which may include one or more microprocessors and/or one or more circuits, such as an application specific integrated circuit (ASIC), field-programmable gate arrays (FPGAs), or the like, and a data storage or memory system 608, which may include one or more non-volatile storage devices and/or one or more volatile storage devices (e.g., random access memory (RAM)). The antenna array 602 is connected to transceiver 604, which is configured to transmit and receive signals via the antenna array 602.

In embodiments where data processing system 606 includes a microprocessor, computer readable program code may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the data processing system 606 to perform steps described below (e.g., steps described below with reference to the flow charts shown in FIG. 10). In other embodiments, the UE communication device 504 is configured to perform steps described above without the need for code. That is, for example, data processing system 606 may consist of one or more ASICs. Hence, the features of the present invention described above may be implemented in hardware and/or software. For example, in particular embodiments, the functional components of the UE communication device 504 described above may be implemented by data processing system 606 executing computer instructions, by data processing system 606 operating independent of any computer instructions, or by any suitable combination of hardware and/or software.

Figure 7:
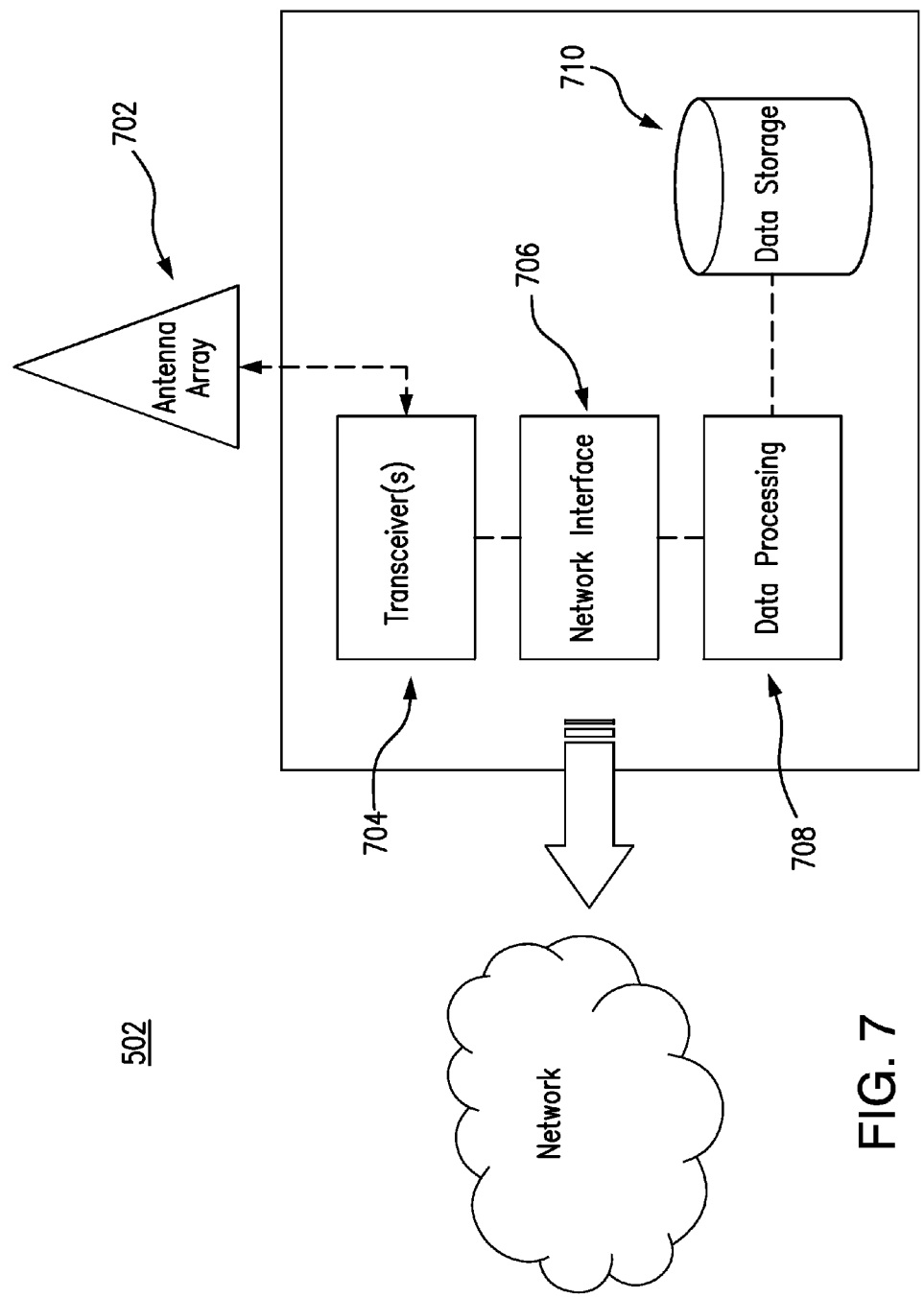
FIG. 7 is a block diagram of a base station in accordance with exemplary embodiments of the present invention.

FIG. 7 illustrates a block diagram of an exemplary base station 502. As shown in FIG. 7, the base station 502 may include: a data processing system 708, which may include one or more microprocessors and/or one or more circuits, such as an application specific integrated circuit (ASIC), field-programmable gate arrays (FPGAs), and the like; a network interface 706; and a data storage system 710, which may include one or more non-volatile storage devices and/or one or more volatile storage devices (e.g., random access memory (RAM)). The network interface 706 is connected to transceiver 704, which is configured to transmit and receive signals via an antenna array 702. According to particular embodiments, the antenna array may be configured to include one or more antenna ports. For instance, antenna array 702 may include a first antenna port 0, and a second antenna port 1, which correspond to ports 0 and 1 of the LTE specification. In an exemplary embodiment of the disclosed devices and methods, the base station 502 is a Node B or Evolved Node B.

In embodiments where data processing system 708 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 708 to perform steps described below (e.g., steps described below with reference to the flow chart shown in FIGS. 8 and 20). In other embodiments, the base station 502 is configured to perform steps described above without the need for code. That is, for example, data processing system 708 may consist merely of one or more ASICs. Hence, the features of the present invention described above may be implemented in hardware and/or software. For example, in particular embodiments, the functional components of the base station described above may be implemented by data processing system 708 executing computer instructions, by data processing system 708 operating independent of any computer instructions, or by any suitable combination of hardware and/or software.

Data may be transmitted in resource blocks between a base station 502 and one or more communication devices 504. According to particular embodiments, in each resource block (RB) used for a data or control channel transmission, a plurality of non-overlapping regions of resource elements (REs) are defined. Each region is associated with at least one unique reference symbols (RS), and may be further associated with one or more antenna ports.

When user equipment 504 demodulates the information it receives in a particular region of an RB, it uses the RS and/or antenna port associated with that region. The RS and/or antenna port information may be used, for example, to estimate a channel of the communication network or to demodulate the data contained within the associated regions.

Figure 4:
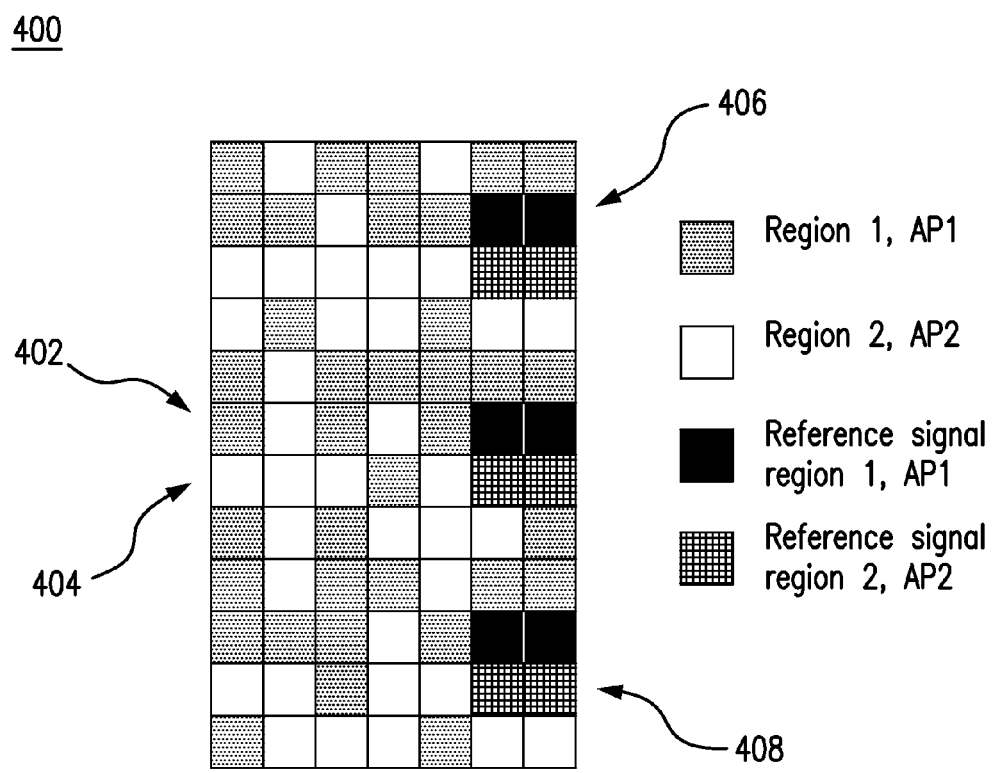
FIG. 4 illustrates a resource block with regions in accordance with exemplary embodiments of the present invention.
Figure 5:
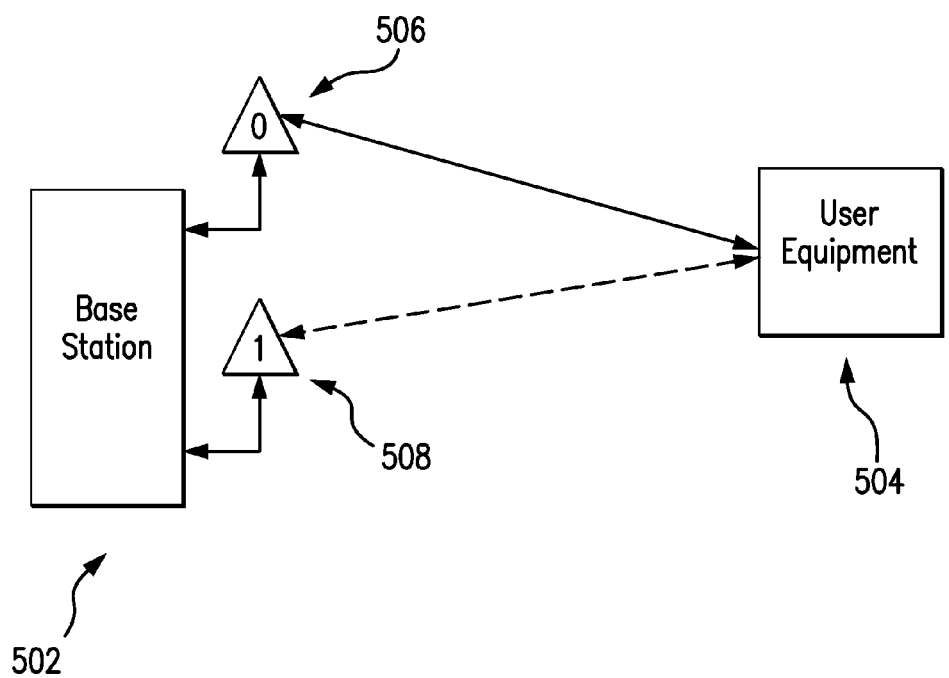
FIG. 5 illustrates a Multiple-Input Multiple-Output (MIMO) communication system.

FIG. 4 illustrates an exemplary resource block consisting of two time-frequency regions 402, 404, where each region has a reference symbol associated with it. The first region 402 is associated with a first reference symbol transmitted in a resource element located in a first reference signal region 406. The second region 404 is associated with a second reference symbol transmitted in a resource element located in a second reference signal region 408. Each region can be used, for example, to transmit control information such as a CCE, a PHICH, or a PBCH, or fractions of such messages elements. In a bases station, such as an eNB, with multiple antenna ports, the two reference symbols may be associated with different antenna ports, for instance, labeled as AP1 and AP2 in FIG. 4.

Figure 8:
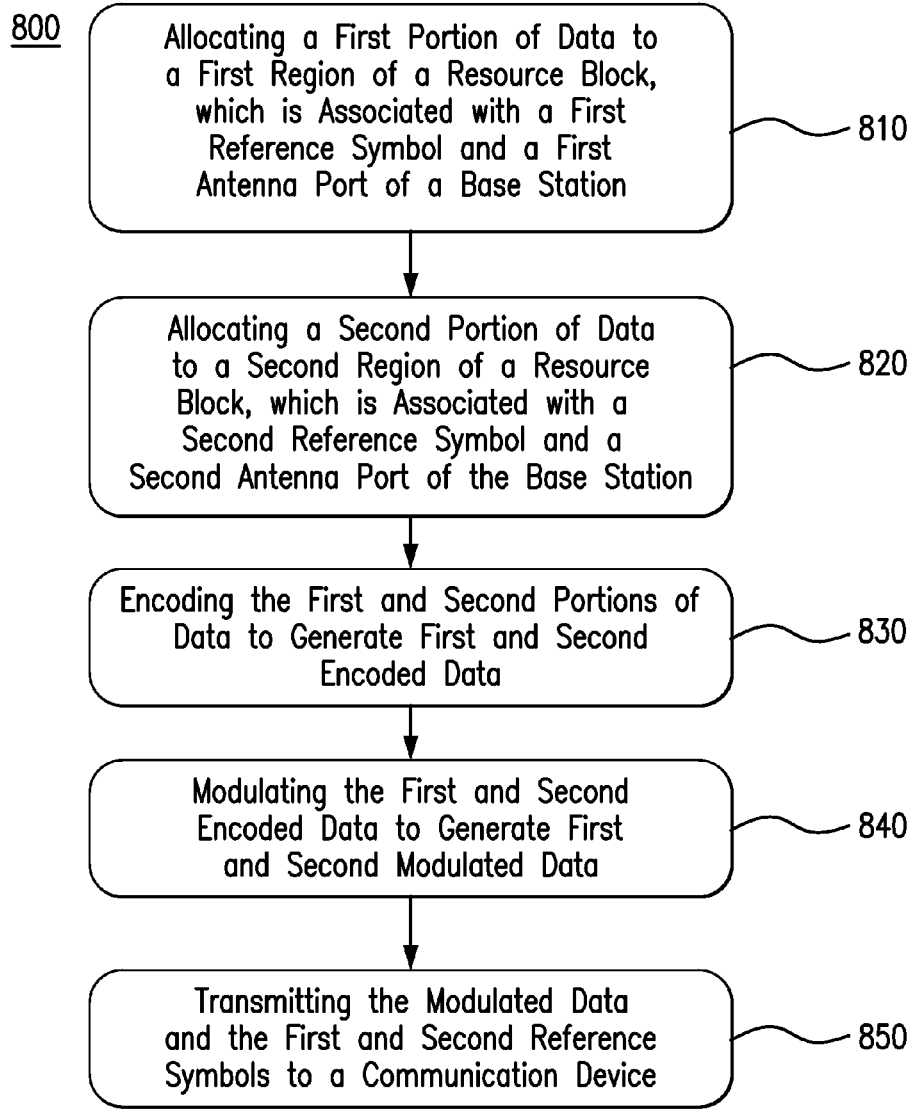
FIG. 8 is a flow chart illustrating a process for transmitting data in accordance with exemplary embodiments of the present invention.

Referring now to FIG. 8, a flow chart 800 illustrating a process for transmitting data in a resource block 400 from a base station 502, which has a plurality of antenna ports, is shown. The resource block 400 includes multiple data regions, such as, regions 402 and 404 illustrated in FIG. 4.

In the first step of the process 810, a first portion of the data is allocated to a first region 402 of the resource block 400. This data is associated with a first reference symbol 406 and a first antenna port of the base station 502. The data may be, for example, a control message. According to particular embodiments, the control message may include commands related to power control, scheduling information, ACK/

NACK response, and/or system information. Furthermore, the first reference symbol 406 may be a UE-specific reference symbol.

In step 820, a second portion of the data is allocated to a second region 404 of the resource block 400. This data is associated with a second reference symbol 408 and a second antenna port of the base station 502. As with the first data, this data may be, for example, a control message and my include commands related to power control, scheduling information, ACK/NACK response, and/or system information.

In step 830, the first portion of data is encoded to generate first encoded data. Similarly, the second portion of the data is encoded to generate second encoded data. The encoded data is then modulated in step 840 to generate first and second modulated data.

In step 850, the first and second modulated data, along with the first and second reference symbols, are transmitted to a communication device 504. The first modulated data and the first reference symbol may be transmitted on the first antenna, while the second modulated data and second reference symbol are transmitted on the second antenna.

According to particular embodiments, a base station 502, such as the device diagrammed in FIG. 7, is operable in a communications network and includes a plurality of antenna ports 702, a transceiver 704, and data processing resources 708, which together are configured to transmit data in a resource block as detailed in the flow chart of FIG. 8.

Figure 10:
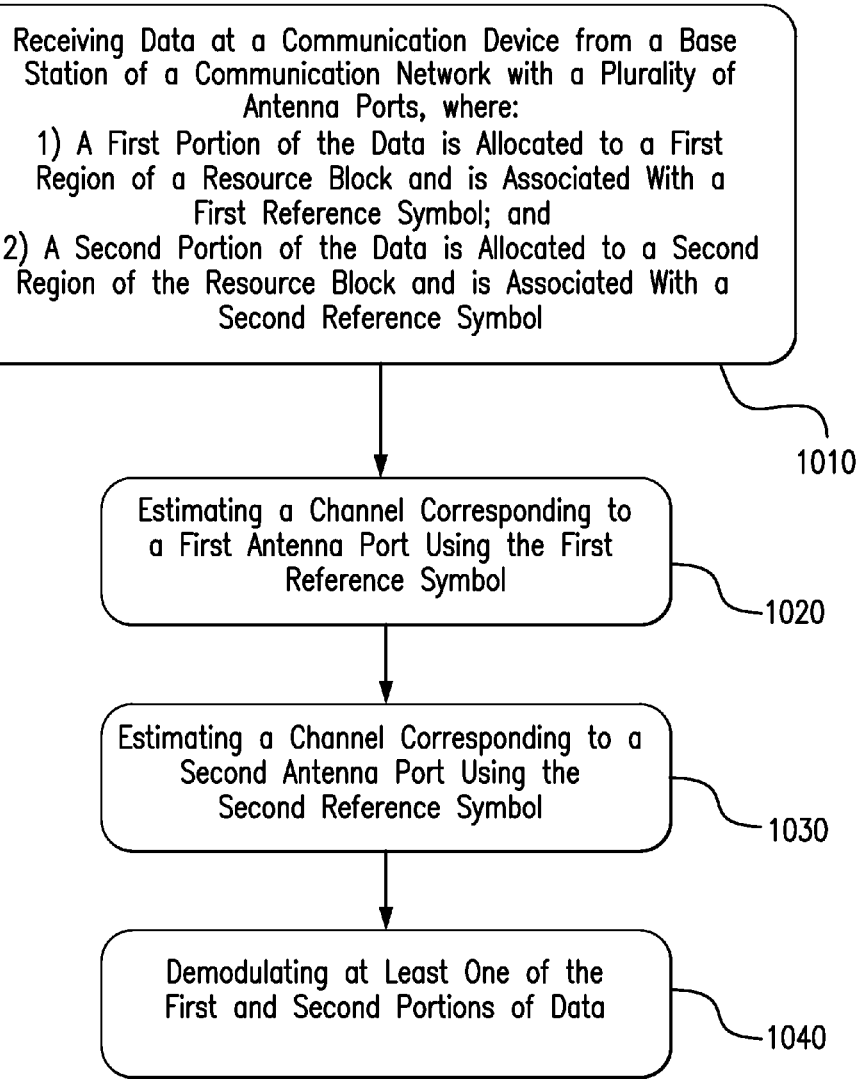
FIG. 10 is a flow chart illustrating a process for demodulating data in accordance with exemplary embodiments of the present invention.

Referring to FIG. 10, a flow chart 1000 illustrating a process for demodulating data received in a resource block by a communication device, is shown.

In step 1010, the communication device receives data from a base station 502 of a communication network. The base station may be, for example, an eNB as diagrammed in FIG. 7. According to the embodiment, the base station 502 has a plurality of antenna ports, which may include, for example, antenna ports 0 and 1 of the LTE specification.

A first portion of the data is allocated to a first region of a received resource block, such as resource block 400 illustrated in FIG. 4. A second portion of the data is allocated to a second region of the resource block. Each of the regions is associated with a first and second reference symbol, respectively.

In step 1020, the communication device estimates a channel corresponding to a first antenna port of the base station 502 using the first reference symbol. According to embodiments of the present invention, the first reference symbol may be uniquely associated with the first antenna port. Similarly, in step 1030, the communication device estimates a channel corresponding to a second antenna port of the base station using the second antenna port, which may be uniquely associated with the second antenna port.

In step 1040, at least one of the first and second data is demodulated. The step may further include performing de-rate-matching and decoding on the demodulated data.

According to particular embodiments, a UE communication device 504, such as the device diagrammed in FIG. 6, includes an antenna array 602, transceiver 604, and data processing resources 606, which together, are configured to demodulated data received in a resource block as detailed in the flow chart of FIG. 10.

FIGS. 9 and 11-13 illustrate exemplary partitioning of a resource block into regions along with the association of the regions to reference symbols and antenna ports. The use of an RB to illustrate embodiments in this disclosure may straightforwardly be extended to an RB pair if, for instance, data is mapped to both slots in a sub-frame.

For example, in a RB used for control channel transmission, a plurality of orthogonal time-frequency and code resources may be defined. Accordingly, a partition referred to herein as a resource, may be defined as a region consisting of a subset of resource elements in the RB plus a cover code. The cover code may be selected, for instance, from a set of orthogonal cover codes. According to particular embodiments of the present invention, each resource is associated with one or more unique reference symbols, where the resource elements carrying the associated reference symbols are also transmitted in the same RB or the same RB pair as the resource. When transmitted form a base station with multiple antenna ports, for instance base station 502, an RS is transmitted on one of the antenna ports. When a UE demodulates the information in a given resource of the transmitted RB, it can use the RS/antenna port associated with that resource for processing. For instance, the RS/antenna port can be used for accurate channel estimation.

According to certain embodiments, within one or more resources, control information is transmitted including, but not limited to, a CCE (belonging to a PDCCH), a PHICH or a PBCH. If a region is too small to fit a whole CCE, PHICH or PBCH, a fraction of these messages can be transmitted in a first region, and the other fractions in a second region elsewhere in the sub-frame. The second region may be associated with another RS and, thus, may be associated with another antenna port. An exemplary use of a fractional message in a region is the transmission of one half of a CCE in a first resource of a first RB from a first antenna port, and the transmission of the other half of the same CCE in a second resource of a second RB from a second antenna port. According to this transmission scheme, both frequency diversity and antenna diversity is obtained.

Figure 9:
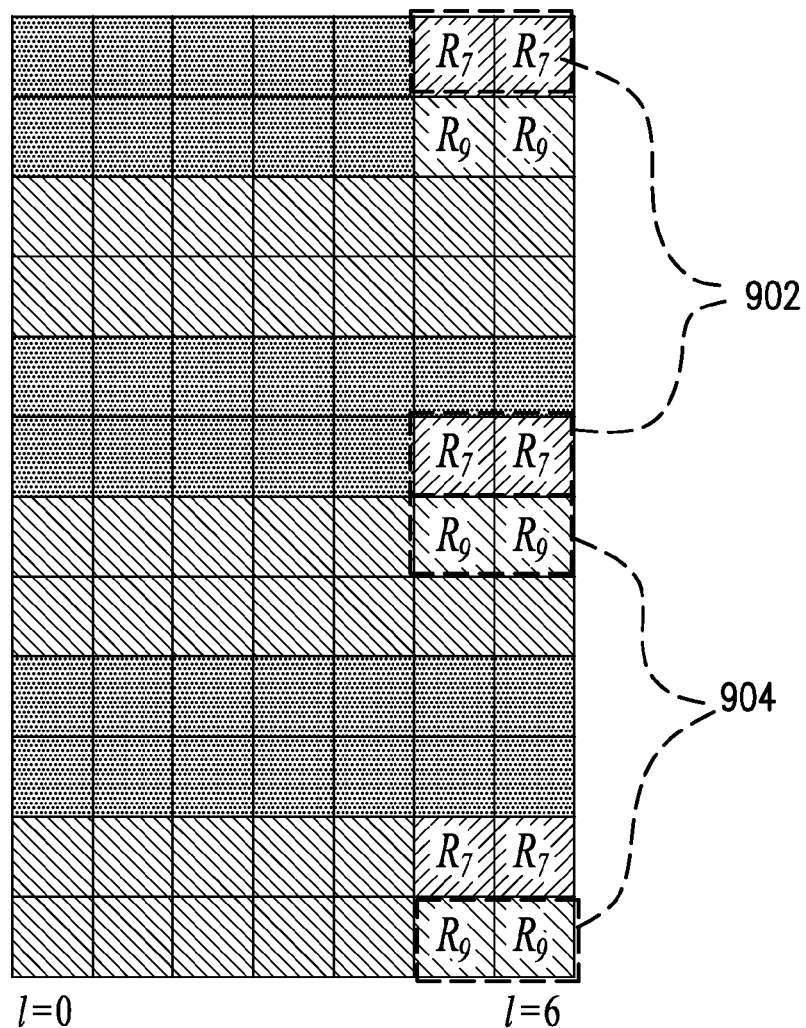
FIG. 9 illustrates a resource block with regions and associated reference symbols in accordance with exemplary embodiments of the present invention.

FIG. 9 shows an exemplary RB with the reference symbol positions for up to four transmission ports, as defined currently in LTE. The resource elements carrying the reference symbols are denoted by $R_7$ and $R_9$. The REs denoted by $R_7$ can contain the RS for antenna port 7, or alternatively for antenna ports 7 and 8 if both ports are used. The RS for the two ports may be overlaid on top of each other using orthogonal cover codes (OCCs). For example, in each pair of adjacent symbols 902 shown in FIG. 9, the transmitted RS for port 7 may use the code $\{+1, +1\}$ and for port 8 may use the code $\{+1, -1\}$. According to particular embodiments, the RS for antenna ports 9 and 10 are similarly overlaid on the adjacent RE pairs 904 shown in FIG. 9.

FIG. 9 also shows two distinct regions for control message transmission within the RB. In this embodiment, each region has 36 REs which is the same as the number of REs in a CCE on the legacy LTE carrier. The first region, illustrated with dots, is associated with antenna port 7 or antenna ports 7 and 8, whereas the second region, illustrated with hashing, is associated with port 9 or ports 9 and 10.

According to particular embodiments, the RS for any of the antenna ports is not necessarily transmitted. For instance, the RS for a given antenna port does not need to be transmitted when the corresponding region is not used. This allows, for example, for the use of UE allocations and search spaces (locations where the UE performs blind decoding to search for messages addressed to it) that are defined in terms of CCEs for the legacy PDCCH, to be carried over to the control channel based on UE-specific RS. The only necessary change in existing schemes is the mapping of the CCEs to REs.

Figure 11:
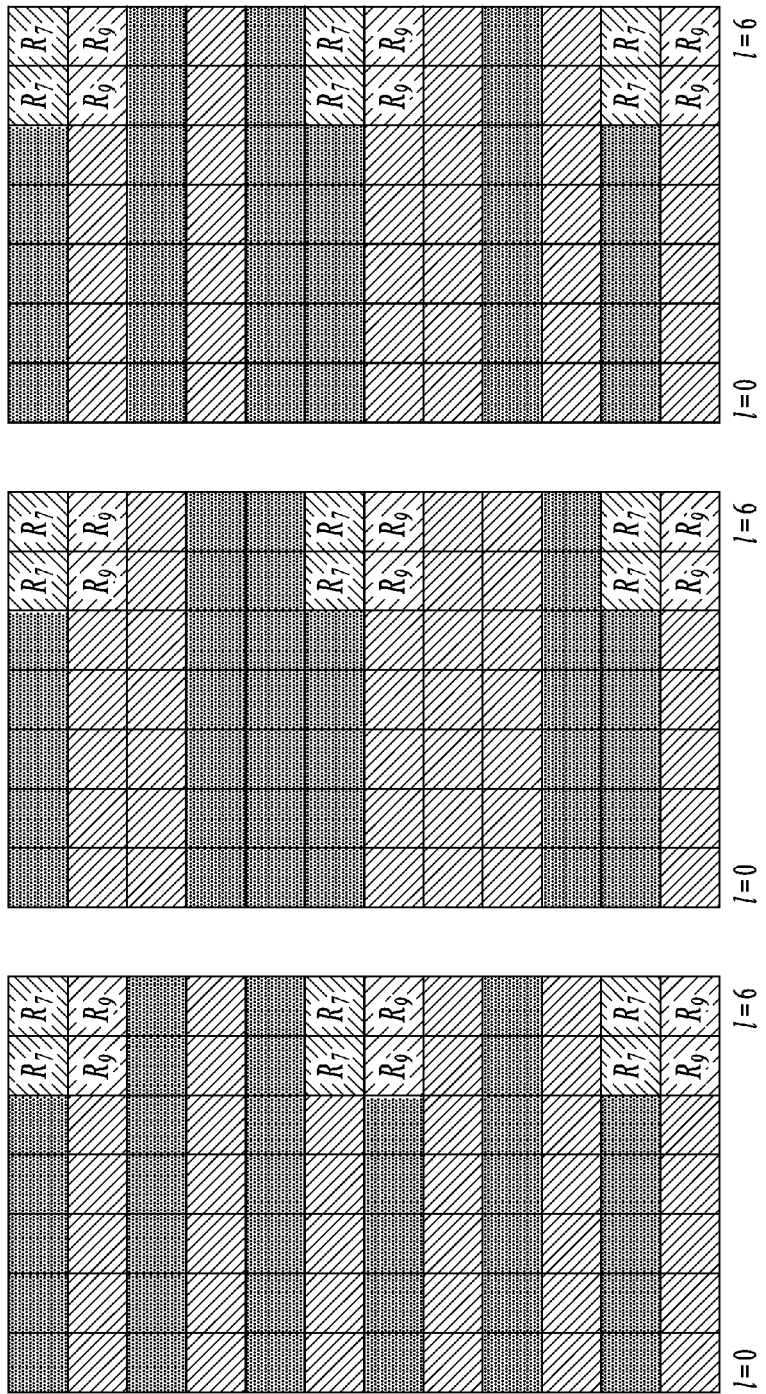
FIG. 11 illustrates exemplary resource blocks with regions and associated reference symbols in accordance with exemplary embodiments of the present invention.

In embodiments of the present invention, the partitioning of resources within an RB or RB pair into multiple, non-overlapping regions with associated unique RS and antenna ports may be implemented in various ways, for instance, as provided in FIG. 11. According to further embodiments of the present invention, the resources may be partitioned based on a number of schemes, such as frequency division multiplexing (FDM) as well as time division multiplexing (TDM) and code division multiplexing (CDM).

Figure 12:
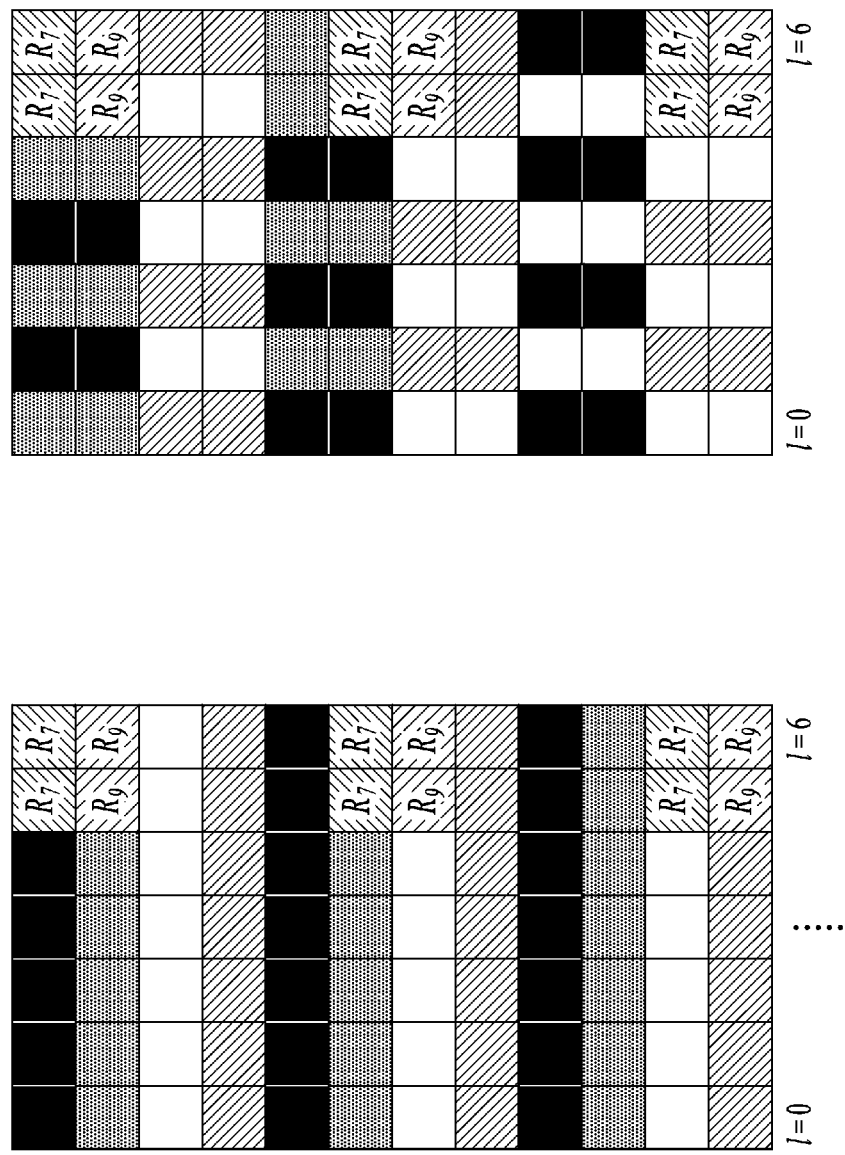
FIG. 12 illustrates exemplary resource blocks with four regions and associated reference symbols in accordance with exemplary embodiments of the present invention.

For instance, FIG. 12 illustrates two exemplary configurations where an RB has been partitioned into four regions. According to this example, no cover codes for the information are required. Thus, the region illustrated with dots is associated with antenna port 7, the region illustrated with black blocks is associated with antenna port 8, the region illustrated with hashing is associated with antenna port 9, and the region illustrated with white blocks is associated with antenna port 10. As previously described, the RS for antenna ports 8 and 10 may be transmitted using orthogonal cover codes in the same REs that are used by ports 7 and 9, respectively.

Code division multiplexing (CDM) may also be incorporated into a partitioning scheme to create additional associations between resources and reference symbols. For instance, two cover codes of {+1,+1} and {+1,−1} could be applied to a region, e.g., the region shown with dots in FIGS. 9 and 11. Accordingly, the region illustrated with dots with cover code {+1,+1} would be associated with antenna port 7 and the region illustrated with dots with cover code {+1,−1} would be associated with antenna port 8. Similarly, the region illustrated with hashing shown in FIGS. 9 and 11, with cover code {+1,+1}, would be associated with antenna port 9 and the region illustrated with hashing with cover code {+1,−1} with antenna port 10. This approach can provide an alternative to the implementation using for four-region partitioning and RS association shown in FIG. 12.

Figure 13:
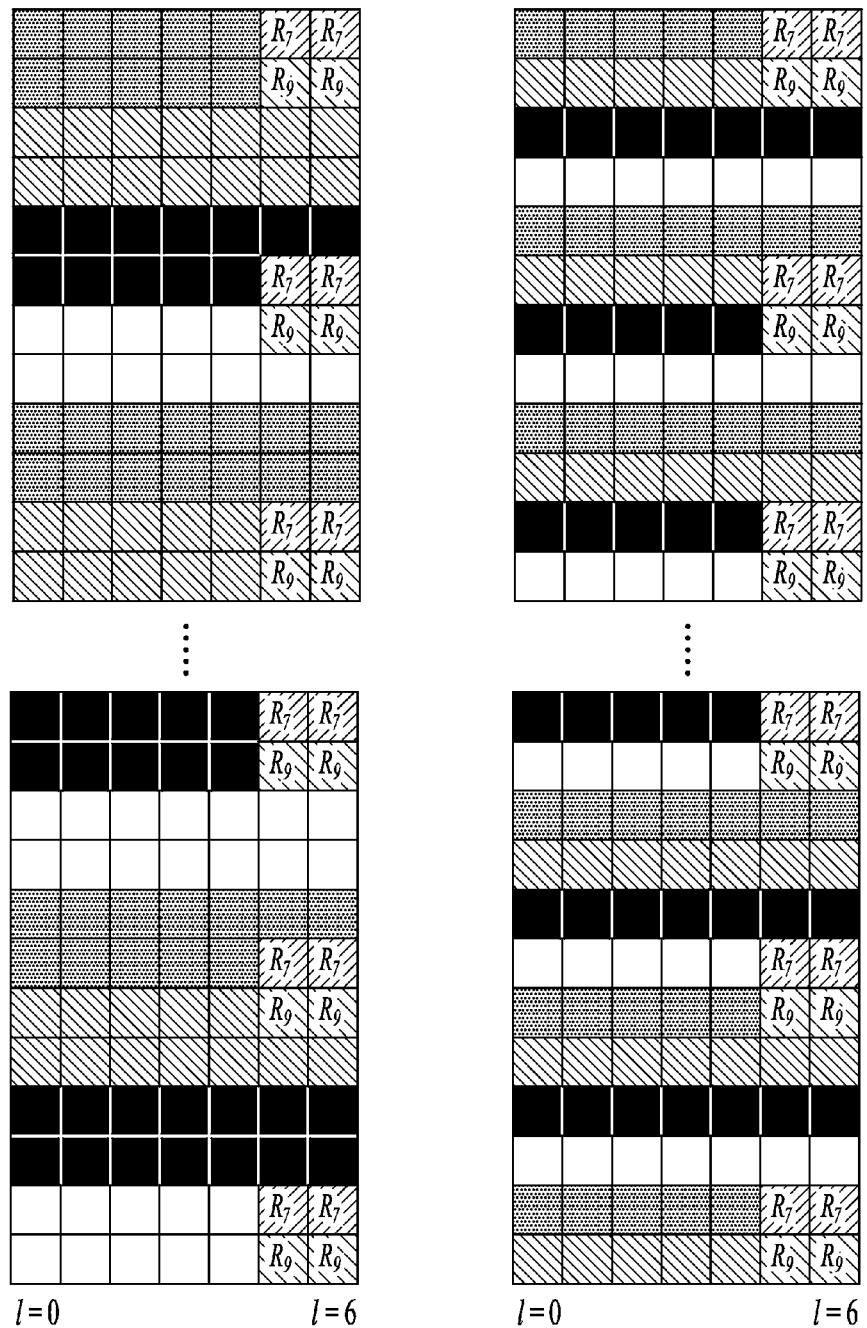
FIG. 13 illustrates exemplary resource blocks with regions and associated reference symbols in accordance with exemplary embodiments of the present invention.

According to certain embodiments, a plurality of RBs may be used together for defining region partitions and RS associations in order to embed frequency diversity into the region transmission. For instance, as shown in FIG. 13, four regions and their associated reference symbols and antenna ports are defined using resource elements within two RBs. In this embodiment, the two RBs have frequency separation. The region illustrated with dots is associated with antenna port 7. The region illustrated with hashing is associated with antenna port 9. The region illustrated with black blocks is associated with antenna port 8. The region illustrated with white blocks is associated with antenna port 10.

In a legacy LTE carrier, with PDCCH as a control channel example, multiple control channel elements (CCEs) can be aggregated to send a single message. The number of CCEs being aggregated may be referred to as an aggregation level for the message. This concept can be applied to embodiments of the present invention with the aggregation occurring across regions. For instance, when mapping control messages from a PDCCH as currently defined in LTE, for embodiments where a region is defined as having 36 REs, a CCE could be directly mapped to a region. However, a CCE could also be split with different fractional CCEs being transmitted in different regions. The same principles could be applied to mapping PHICH, PBCH and other control messages to regions as well.

According to certain embodiments, the embodiments described herein may be used to enable the flexible use of various transmission modes. For instance, FIGS. 14-18 illustrate exemplary embodiments mapping information to resources and antenna ports which allows for the transmission of both common (with wide area coverage) and UE-specific (directed to the given UE) control messages by adjusting the pre-coding applied to the resources where the given message is transmitted. In this manner, control messages may be mapped to multiple resources and the base station 502, such as an eNB, can control how the resources are utilizing the antenna ports. This provides maximum flexibility and enables transmission modes including frequency diversity, frequency shifted transmit diversity (FSTD), space frequency/time block coding (SFBC/STBC), and combinations thereof.

Figure 14:
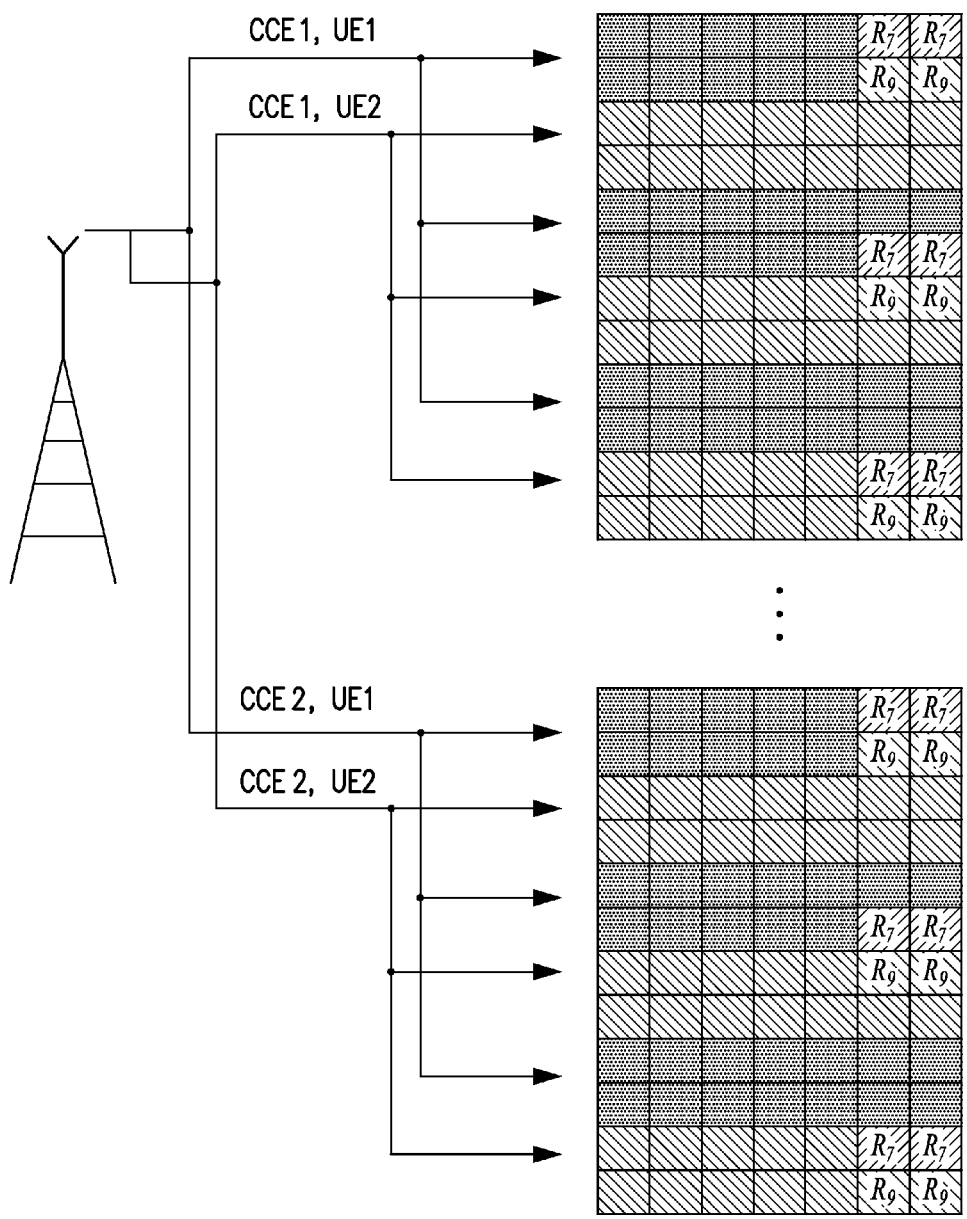
FIG. 14 illustrates exemplary resource blocks with regions and associated reference symbols for transmission with frequency diversity in accordance with exemplary embodiments of the present invention.

In transmissions utilizing frequency diversity, frequency diversity may be achieved independently of the number of transmit antenna ports, by assigning information, such as a control message, to multiple resources. These resources are spread across frequency, and in certain embodiments, spread across different RBs. For example, as shown in FIG. 14, frequency diversity may be used for a transmission from a single antenna with an aggregation level of two, to two UEs. In this example, two CCEs are used and mapped to different regions in two RBs, which are spread out in frequency. As in LTE Rel-8, aggregation levels can be higher than 2. For instance, LTE support aggregation levels as high as 8.

In transmission modes including frequency shifted transmit diversity (FSTD), information, such as a control message, is also assigned to multiple resources where the individual regions are assigned to a plurality of different antenna ports. According to this embodiment, a UE receives a plurality of streams, concatenates them, then demodulates and decodes the message. Additionally, the eNB could assign different pre-coding vectors to define the multiple antenna ports.

Figure 15:
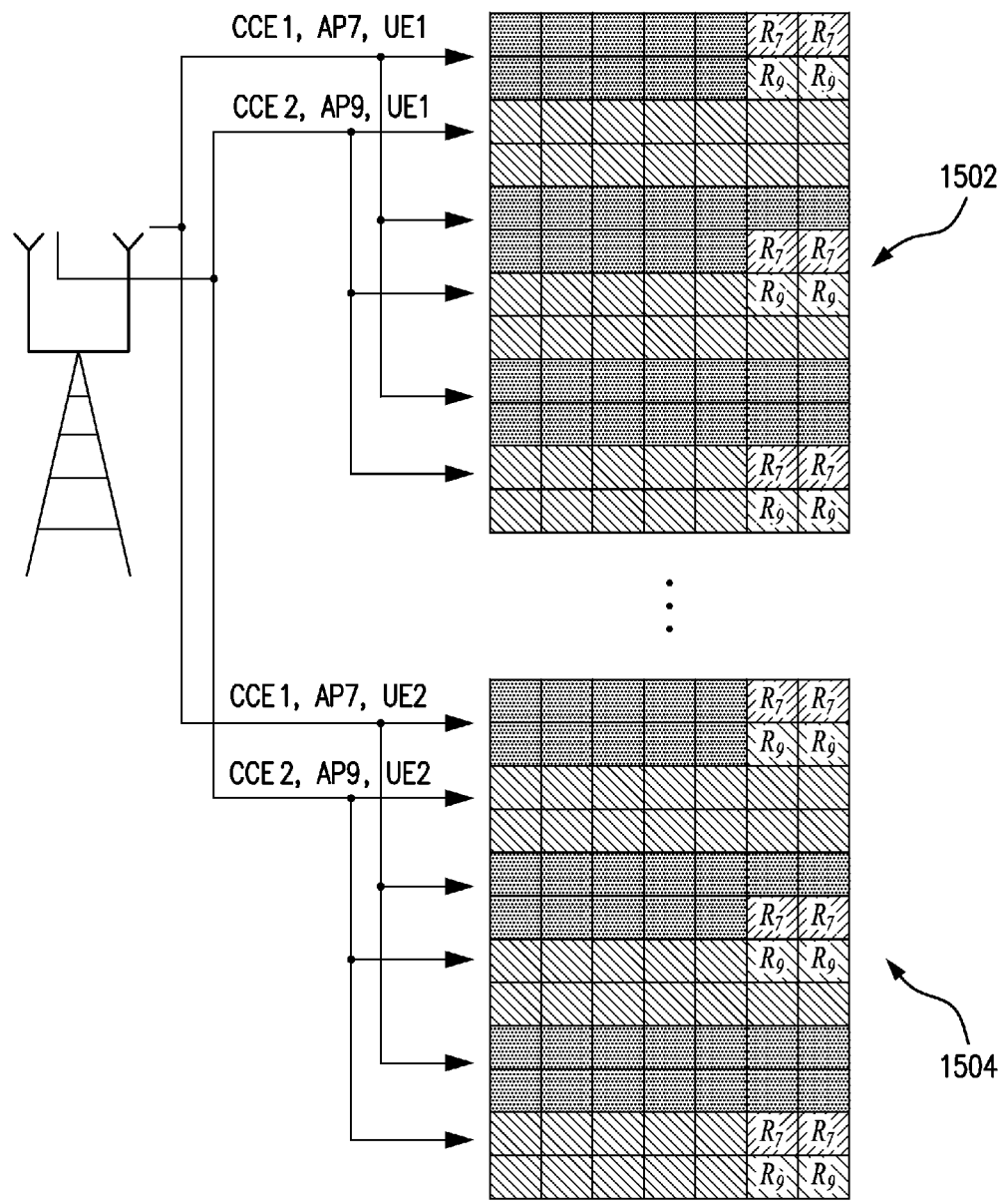
FIG. 15 illustrates exemplary resource blocks with regions and associated reference symbols for transmission with frequency shifted transmit diversity in accordance with exemplary embodiments of the present invention.

According to an exemplary illustration of this transmission mode, as shown in FIG. 15, the transmitted symbols are split between multiple streams transmitted across multiple antennas in multiple different sets of REs. A UE receives all of the streams, concatenates them, demodulates and decodes the message. This is achieved by assigning different CCEs, for example CCE 1 and 2 in FIG. 15, to different regions. The regions may be within the same RB or across multiple RBs, and the antenna ports (AP) for each region may be pre-coded. The illustration of FIG. 15 has an aggregation level of two for two UEs. The first UE has its CCEs split between the dotted and hashed regions in the first RB 1502 with each region, and thus each CCE, being transmitted over different antenna ports. The second UE, similarly, receives its message in the second RB 1504.

Both frequency diversity and frequency shift transmit diversity can be both achieved with aggregation level two transmission. For instance, with respect to the example of FIG. 15, the first half of the control channel for UE1 can be transmitted in one RB 1502 via the CCE mapped to the region associated with antenna port 7 (illustrated with dots) and the second half can be transmitted in the other RB 1504 via the CCE mapped to the region associated with antenna port 9 (illustrated with hashing).

Figure 16:
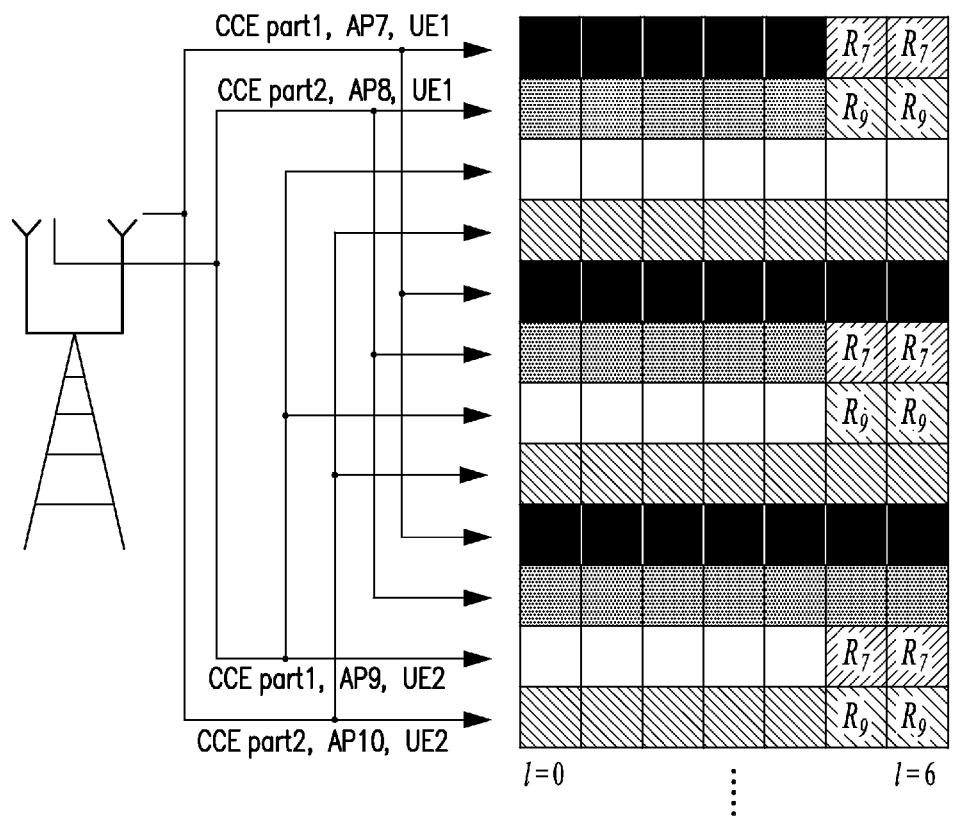
FIG. 16 illustrates an exemplary resource block with regions and associated reference symbols for transmission with frequency shifted transmit diversity in accordance with exemplary embodiments of the present invention.

In another embodiment, frequency shifted transmit diversity can be achieved over a single RB, as shown in FIG. 16. In the present example, each UE has an aggregation level of 1 and, therefore, transmits only one CCE. This CCE can be split into multiple parts, two in the present example, and transmitted over different antenna ports.

A transmit diversity scheme referred to as Space Frequency/Time Block Coding (SFBC/STBC), and also commonly known as the Alamouti scheme, transmits variations of the same symbols on a pair of antenna ports. Certain embodiments may achieve transmit diversity according to this scheme by associating multiple RS/antenna ports, for example two RS/antenna ports, to a resource and transmitting information, such as a control message, on the multiple antenna ports according to the Alamouti scheme. In this embodiment, each port may be associated with an antenna or a virtual antenna (e.g., using precoding).

Figure 17:
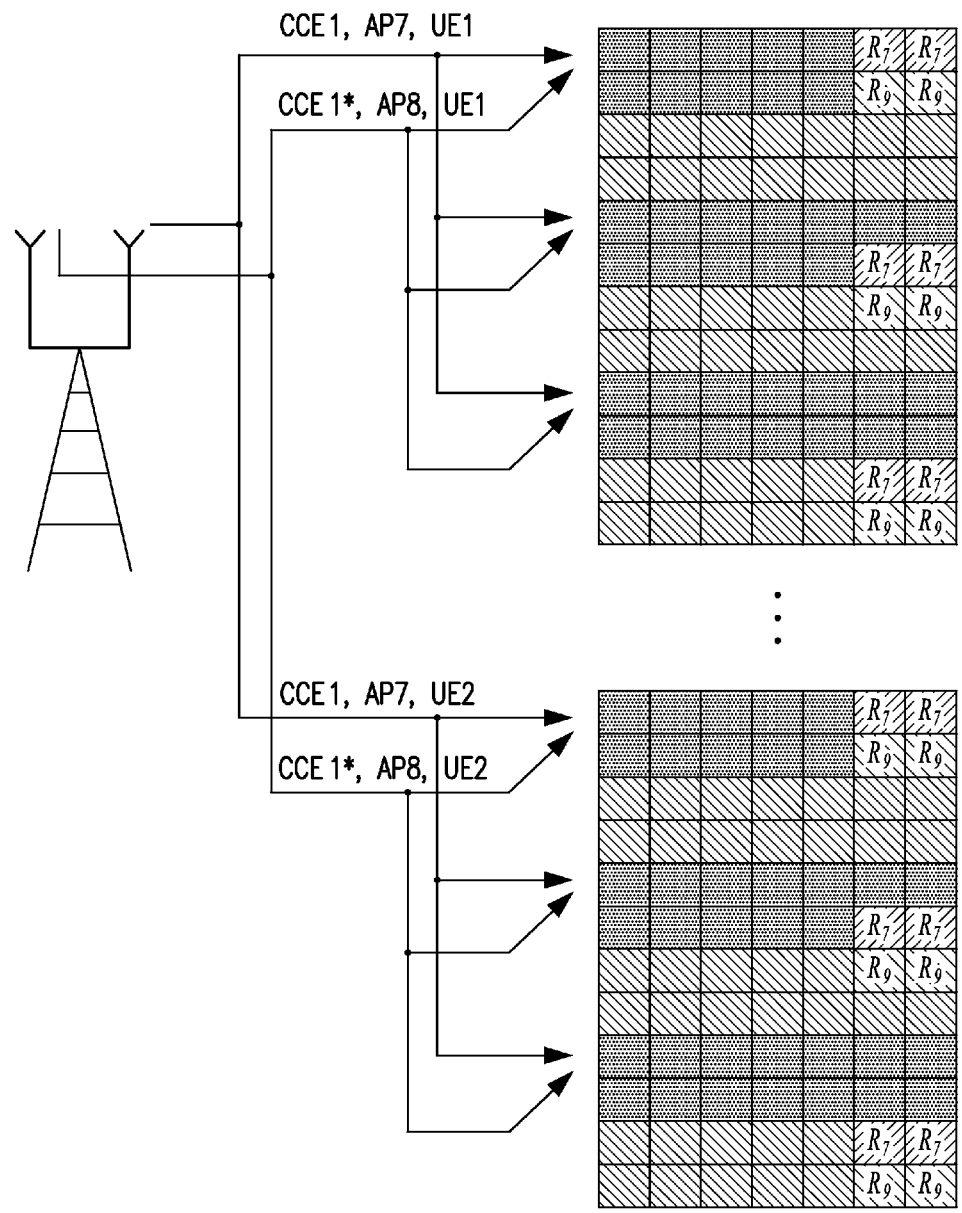
FIG. 17 illustrates exemplary resource blocks with regions and associated reference symbols for space-frequency-time coded transmission in accordance with exemplary embodiments of the present invention.

As illustrated in FIG. 17, transmit diversity according to this scheme is achieved by transmitting information, such as a control message, mapped to a region with two antenna ports associated with the region, where each port may be pre-coded. According to this example, the signal being transmitted from the second port is a variation of the signal being transmitted on the first port and is denoted by a "*" superscript in FIG. 17.

Certain embodiments may use a combination of the above-discussed schemes. For instance, information, such as a control message, can be mapped to at least two resources in an RB, where each region is associated with two antenna ports. Accordingly, the message is transmitted on four antenna ports. In this embodiment, the message is first partitioned into two streams in accordance with the FSTD scheme discussed above. Each stream is then mapped to a separate resource and the stream, and its variation, is transmitted in that resource using two different antenna ports. The antenna port pairs for each resource are different. Thus, 4-port antenna diversity is achieved.

Figure 18:
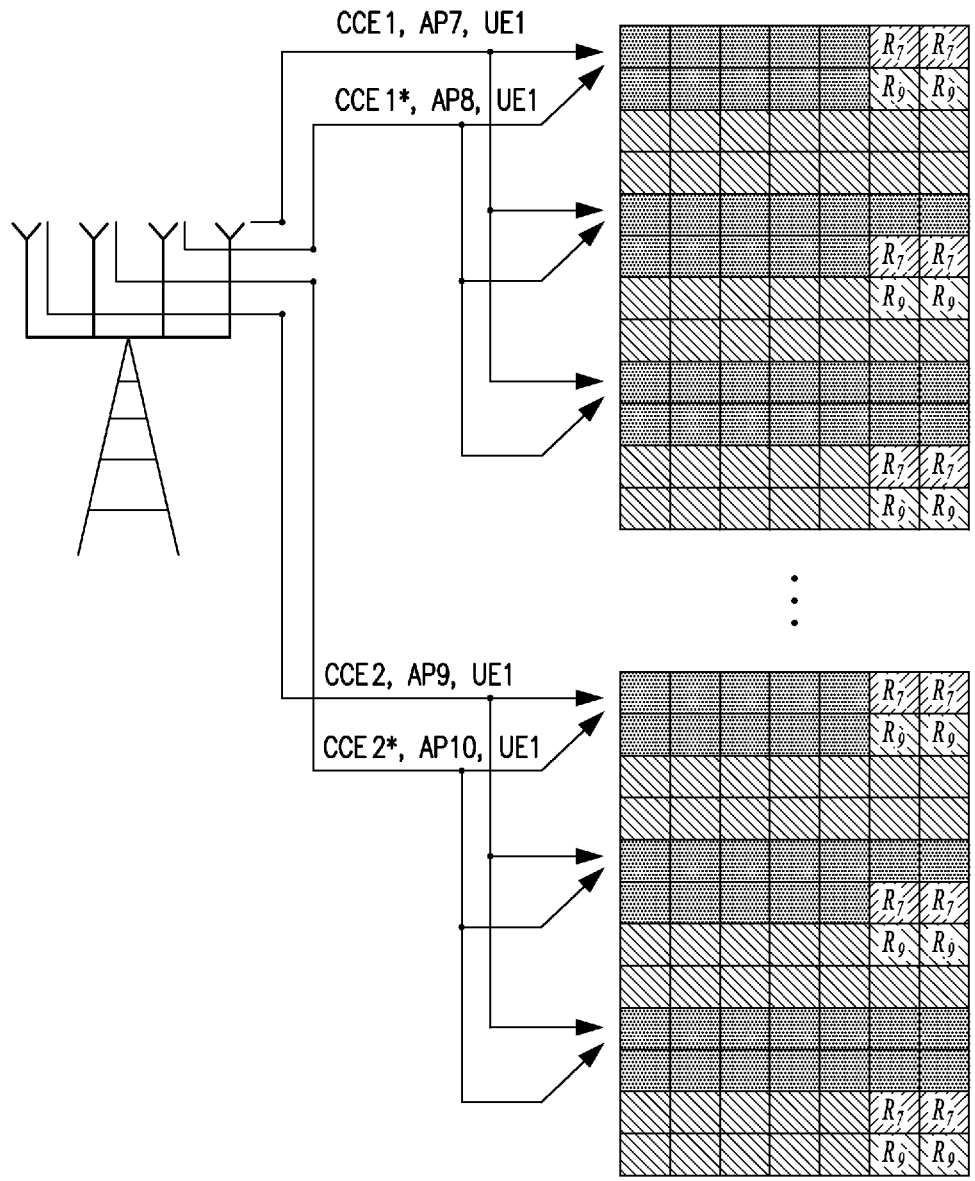
FIG. 18 illustrates exemplary resource blocks with regions and associated reference symbols for transmission with frequency shifted transmit diversity and space-frequency-time coding in accordance with exemplary embodiments of the present invention.

As illustrated in FIG. 18, a control message may be mapped to at least two regions and transmitted on four antenna ports. The message is first partitioned into two streams as per the FSTD scheme. Each stream is then mapped to a separate region and transmitted twice on that region using different antenna ports. The antenna port pairs for each region are different, thus achieving 4-port diversity. This is shown, by way of example, in FIG. 18 for a single UE with the two CCEs mapped to regions chosen across different RBs.

According to certain embodiments, when a message, such as control message, is small, the message may be split and distributed over multiple regions, where each region is transmitted in a RB separated with sufficiently large frequency separation as to provide frequency diversity. Exemplary small control messages may include a PDCCH with a single CCE, or a PHICH.

Figure 19:
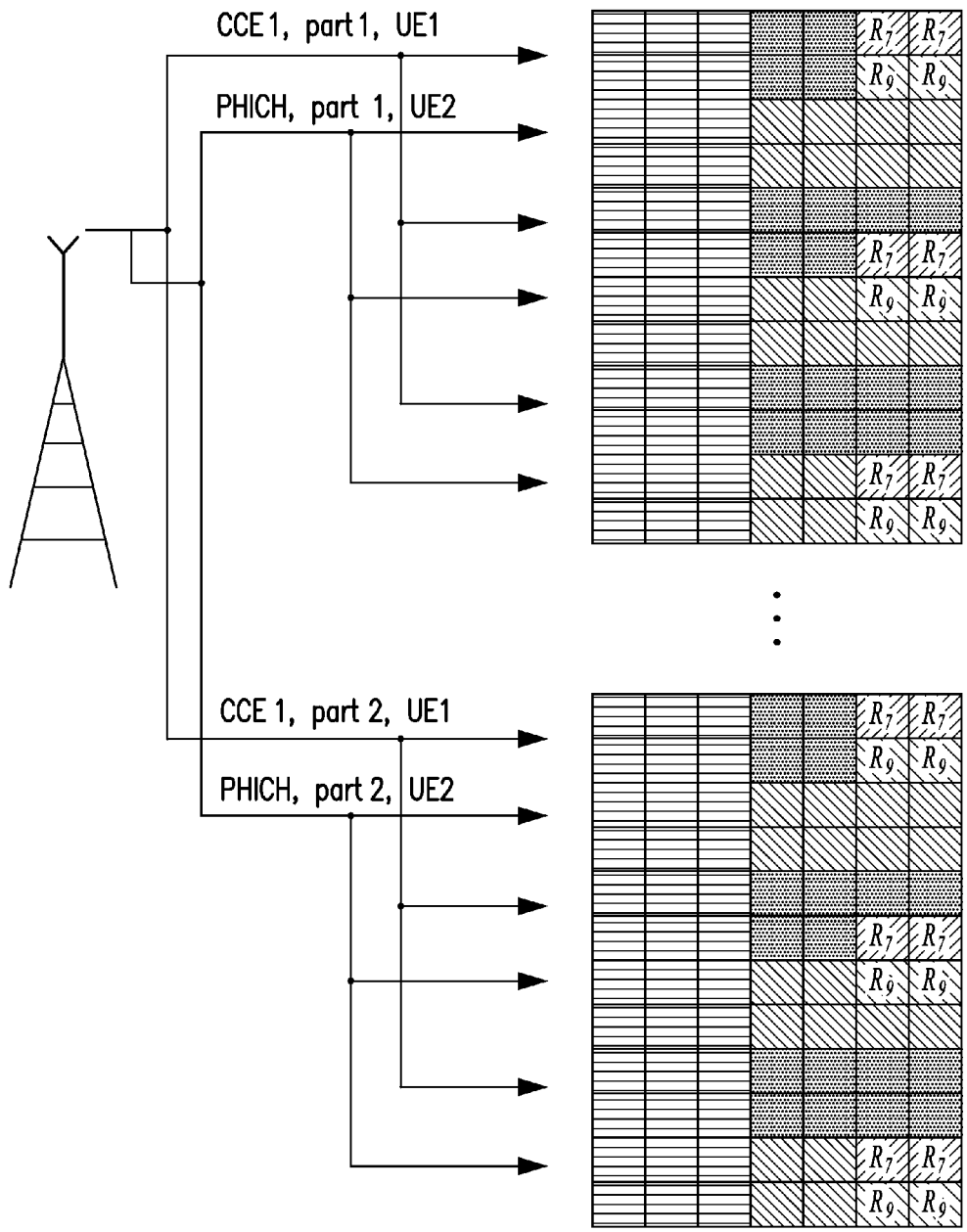
FIG. 19 illustrates exemplary resource blocks with regions and associated reference symbols for transmission of small messages with frequency diversity in accordance with exemplary embodiments of the present invention.

As discussed above, different orthogonal resources within a RB can be utilized by different PDCCHs. A PHICH can also share radio resources with other PDCCHs. This example is illustrated in FIG. 19, where UE 1 receives a PDCCH consisting of a single CCE and UE 2 receives a PHICH.

Figure 1:
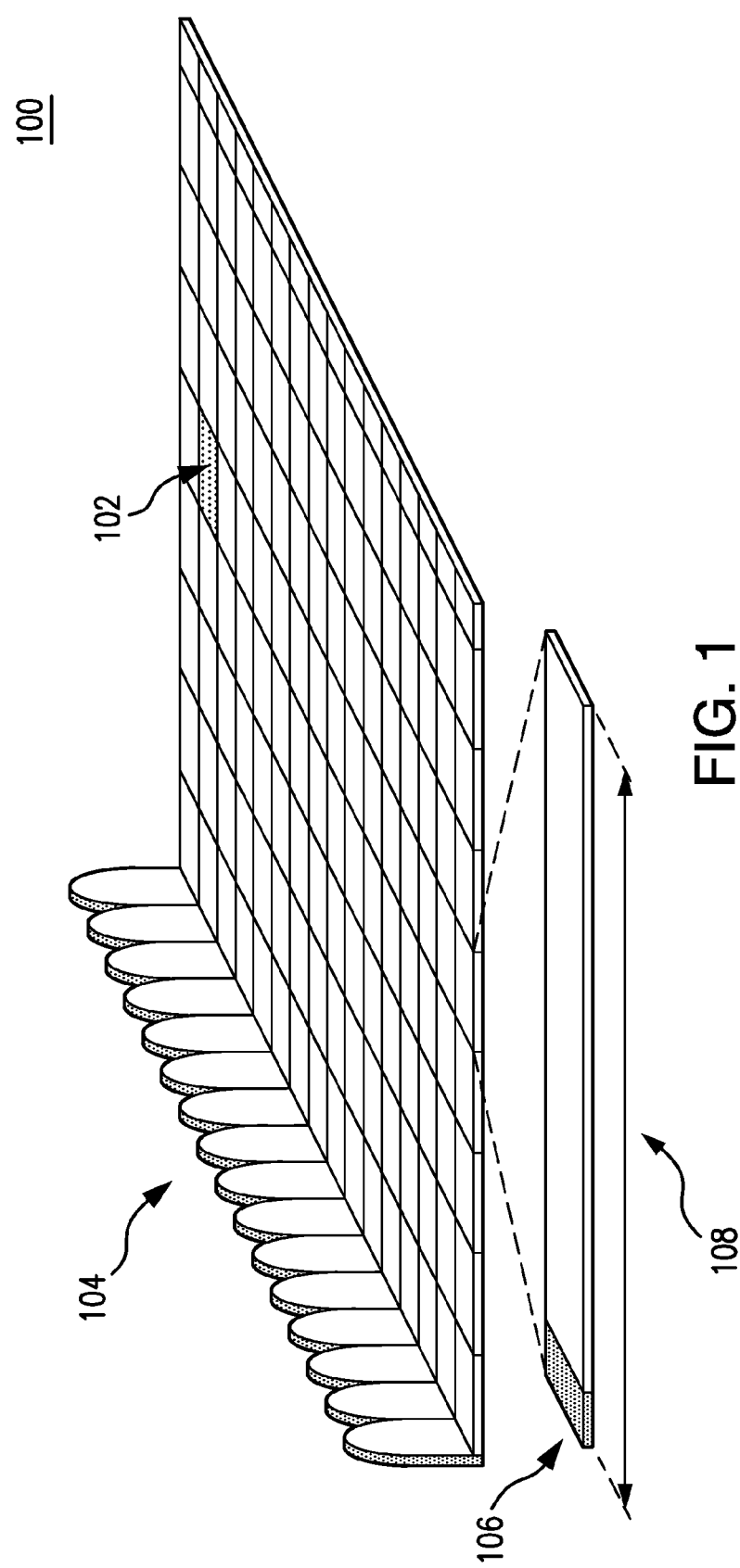
FIG. 1 illustrates an exemplary resource block.
Figure 2:
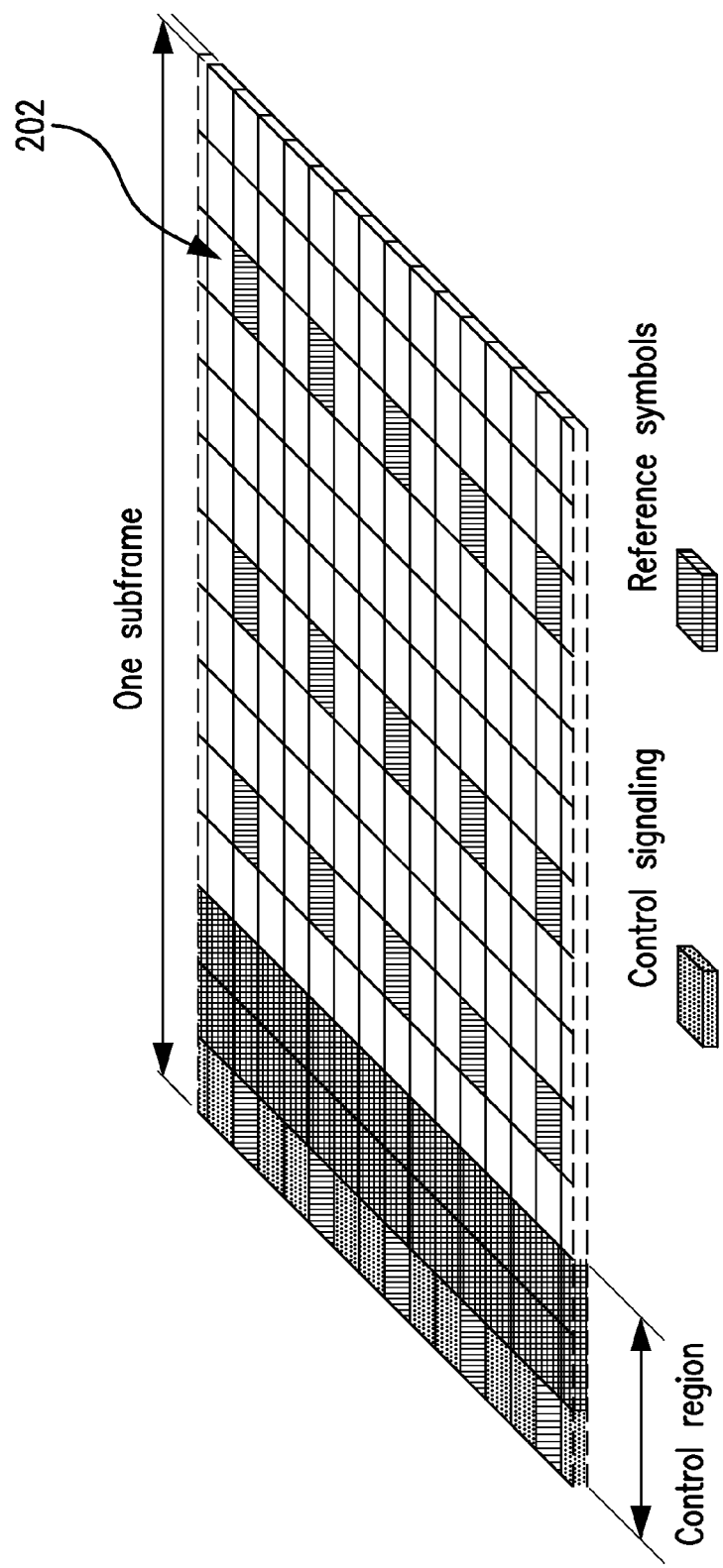
FIG. 2 illustrates an exemplary downlink sub-frame.
Figure 3:
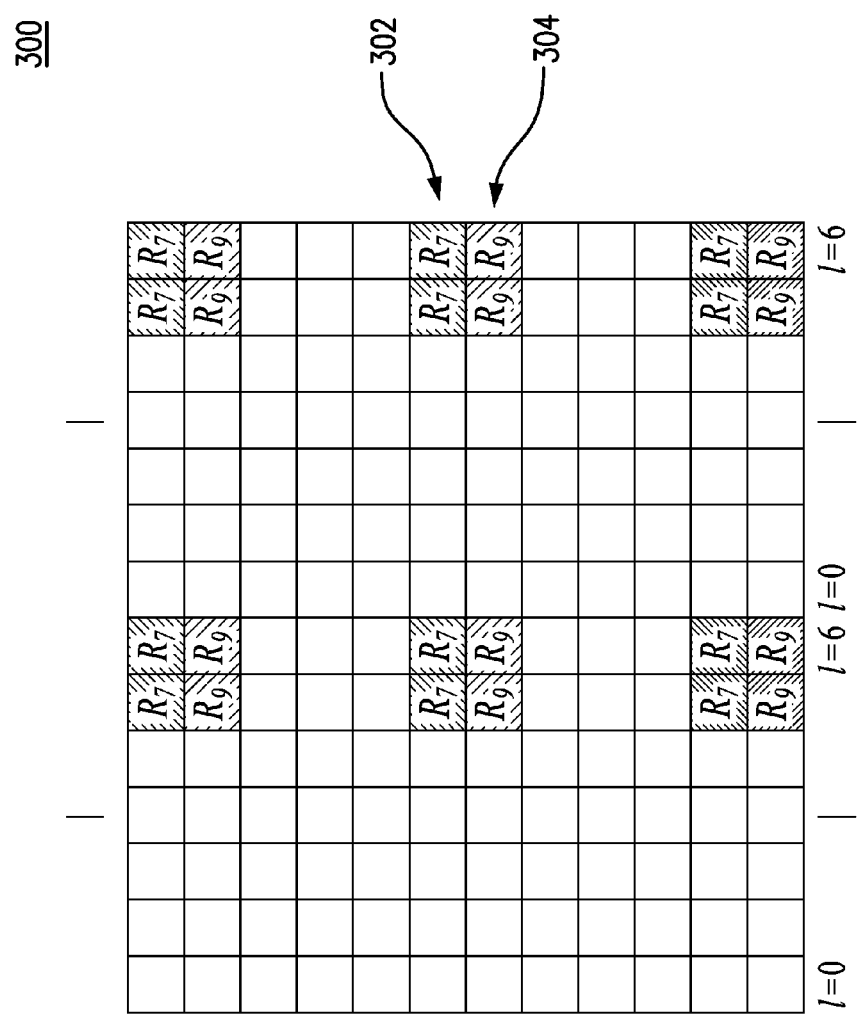
FIG. 3 illustrates a resource block pair with UE-specific reference symbols.

The disclosure of the present invention can be applied to a new carrier type, where all sub-carriers in an RB can be utilized according to the above teachings. However, in a carrier that is backwards compatible to existing LTE system specifications, the initial, for instance first one to four depending on the configuration, OFDM symbols in a subframe may be reserved for control information. This is shown, by way of example, in the allocation of FIG. 2. To enable support of legacy UEs within a cell, the embodiments described above can be applied to the radio resources not allocated to the legacy control region. For instance, as shown in FIG. 19, the embodiments of the invention are applied to the final four OFDM symbols, after the first three are used for legacy operations, in the first slot of a subframe.

Figure 20:
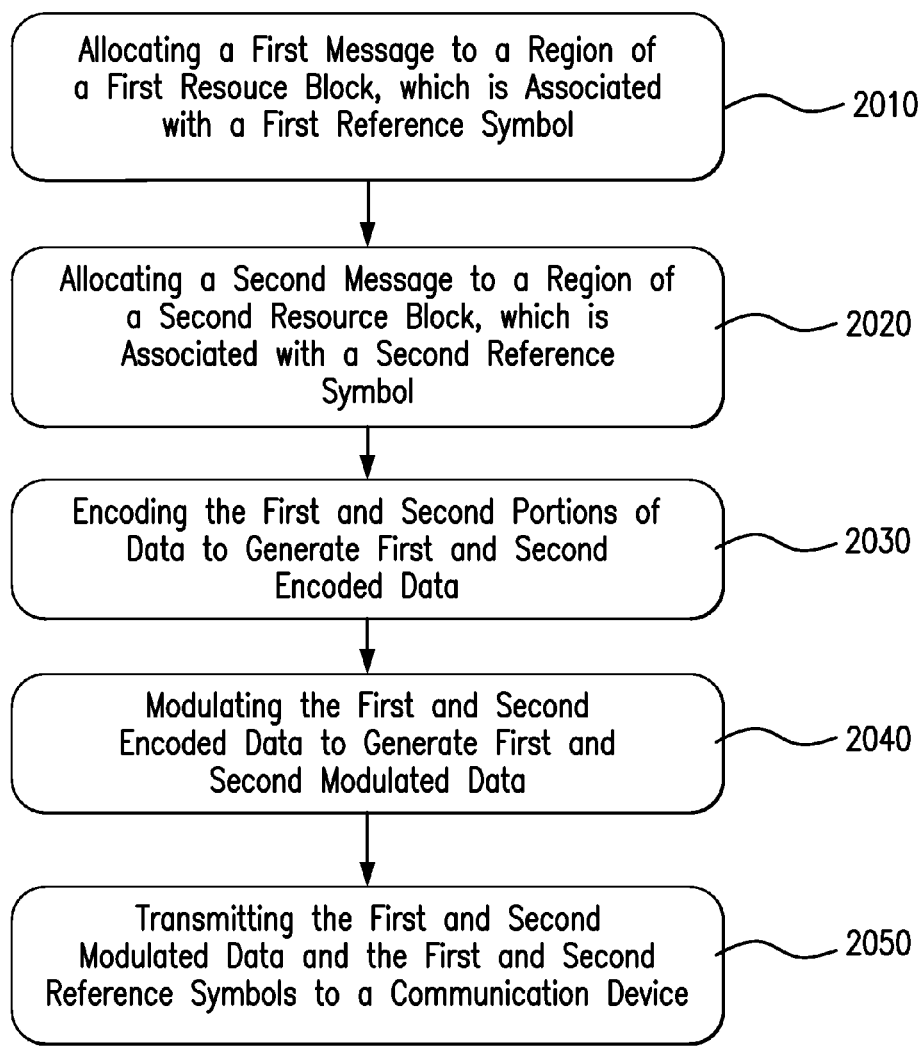
FIG. 20 is a flow chart illustrating a method for transmitting messages from a base station to one or more communication devices in accordance with exemplary embodiments of the present invention.

Referring to FIG. 20, a flow chart 2000 illustrating a method for transmitting a plurality of messages from a base station to one or more communication devices, in accordance with exemplary embodiments of the disclosed devices and methods, is shown.

In the first step 2010, a first message is allocated to a region of a first resource block, which is associated with a first reference symbol. In step 2020, a second message is allocated to a region of a second resource block, which is associated with a second reference symbol. According to particular embodiments, the first and second messages may be independent messages or, alternatively, portions of a single message. Further, the first and second reference symbols may be allocated to resource elements within the same RB or different RBs. These reference symbols may be associated with antenna ports of a base station 502. In certain embodiments, the reference symbols may be associated with one or more specific UEs 504.

In step 2030, the first message is encoded to generate first encoded data and the second message is encoded to generate second encoded data.

In step 2040, the first and second encoded data are modulated to generate first and second modulated data, which is transmitted in step 2050 to one or more communication devices along with the first and second reference symbols.

According to particular embodiments, a base station 502, such as the device diagrammed in FIG. 7, is operable in a communications network and includes a plurality of antenna ports 602, a transceiver 604, and data processing resources 606, which together are configured to transmit messages as detailed in the flow chart of FIG. 20.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for transmitting a message in a resource block from a base station to a communication device, the base station including a plurality of antenna ports and the resource block including a plurality of regions that comprise resource elements, the method comprising:

allocating a first portion of said message to a first region of said plurality of regions, wherein said first portion of said message is associated with a first reference symbol;

allocating a second portion of said message to a second region of said plurality of regions, wherein said second portion of said message is associated with a second reference symbol;

encoding said first and second portions of said message to generate first and second encoded data;

allocating a third portion of said message to a third region of said plurality of regions, wherein said third portion of said message is associated with a third reference symbol; and applying orthogonal cover codes to said first and third reference symbols, wherein said first and third reference symbols are allocated to the same resource elements;

modulating said first encoded data to generate first modulated data;
modulating said second encoded data to generate second modulated data; and
transmitting said first and second modulated data and said first and second reference symbols in said resource block to said communication device, wherein:
said first reference symbol is associated with a first antenna port of said plurality of antenna ports, said second reference symbol is associated with a second antenna port of said plurality of antenna ports, and said third reference symbol is associated with a third antenna port of said plurality of antenna ports, and
said first portion is a control message and said first reference symbol is a user equipment (UE) specific reference symbol,
wherein said first reference symbol is uniquely associated with said communication device.

2. The method of claim 1, wherein said control message includes commands related to one or more of power control, scheduling information, acknowledgment/negative acknowledgment (ACK/NACK) response and system information.

3. The method of claim 1, further comprising applying orthogonal cover codes to said first and second reference symbols, wherein said first and second reference symbols are allocated to the same resource elements.

4. The method of claim 1, wherein said first region and said third region are the same.

5. The method of claim 4, further comprising applying said orthogonal cover codes to said first and third portions of said message.

6. The method of claim 1, further comprising:
applying a first cover code to said first region; and
applying a second cover code to said second region,
wherein said first cover code is associated with a first antenna port of said base station and said second cover code is associated with a second antenna port of said base station.

7. The method of claim 1, wherein transmitting comprises:
transmitting said first modulated data and said first reference symbol on said first antenna port; and
transmitting said second modulated data and said second reference symbol on said second antenna port.

8. The method of claim 1, wherein said control message is a control channel element (CCE) and said first portion is a first part of said CCE and transmitted from a first antenna port of said base station and said second portion is a second part of the same CCE and transmitted from a second antenna port of said base station.

9. The method of claim 1, wherein the first portion and the second portion are mapped to separate regions and transmitted twice on the separate regions using different antenna ports.

10. The method of claim 1, wherein the first region and the second region have frequency separation.

11. The method of claim 1, wherein the first reference symbol and the second reference symbol are overlaid on top of each other.

12. The method of claim 1, wherein the reference symbol for a given antenna port is not transmitted when a corresponding region is not used.

13. The method of claim 1, wherein the second reference symbol is not associated with said communication device and is associated with another communication device.

14. The method of claim 1, wherein the resource block is included in a long term evolution (LTE) radio subframe that includes a plurality of resource blocks.

15. The method of claim 1, wherein each region in the plurality of regions includes a UE specific reference symbol.

16. A base station device operable in a communication network for transmitting a message in a resource block, the resource block including a plurality of regions that comprise resource elements, comprising:
a plurality of antenna ports;
a processor configured to:
allocate a first portion of said message to a first region of said plurality of regions, wherein the first portion of said message is associated with a first reference symbol;
allocate a second portion of said message to a second region of said plurality of regions, wherein the second portion of said message is associated with a second reference symbol;
allocate a third portion of said message to a third region of said plurality of regions, wherein said third portion of said message is associated with a third reference symbol;
apply orthogonal cover codes to said first and third reference symbols, wherein said first and third reference symbols are allocated to the same resource element;
encode the first and second portions of said message to generate first and second encoded data;
modulate said first encoded data to generate first modulated data;
modulate said second encoded data to generate second modulated data; and
a transmitter configured to transmit said first and second modulated data and said first and second reference symbols in said resource block to a communications device in said communication network,
wherein:
said first reference symbol is associated with a first antenna port of said plurality of antenna ports, said second reference symbol is associated with a second antenna port of said plurality of antenna ports, and said third reference symbol is associated with a third antenna port of said plurality of antenna ports, and
said first portion is a control message and said first reference symbol is a user equipment (UE) specific reference symbol,
wherein said first reference symbol is uniquely associated with said communication device.

17. The device of claim 16, wherein said control message includes commands related to one or more of power control, scheduling information, acknowledgment/negative acknowledgment (ACK/NACK) response and system information.

18. The device of claim 16, wherein said processor is further configured to apply orthogonal cover codes to said first and second reference symbols, and wherein said first and second reference symbols are allocated to the same resource element.

19. The device of claim 16, wherein said first region and said third region are the same.

20. The device of claim 19, wherein said processor is further configured to apply said orthogonal cover codes to said first and third portions of said message.

21. The device of claim 16, wherein said processor is further configured to:
- apply a first cover code to said first region; and
- apply a second cover code to said second region,
  wherein said first cover code is associated with a first antenna port of said base station and said second cover code is associated with a second antenna port of said base station.

22. The base station of claim 16, wherein said transmitter is further configured to transmit said first modulated data and said first reference symbol on said first antenna port and to transmit said second modulated data and said second reference symbol said second antenna port.

23. The base station device of claim 16, wherein said control message is a control channel element (CCE) and said first portion is a first part of said CCE and said second portion is a second part of the same CCE and said transmitter is configured to:
- transmit said first part of said CCE from a first of said plurality of antenna ports; and
- transmit said second part of said CCE from a second of said plurality of antenna ports.

24. A method for demodulating a data in a resource block including a plurality of regions that comprise resource elements, comprising:
- receiving said message at a communication device from a base station with a plurality of antenna ports, wherein a first portion of said message is allocated to a first region of said plurality of regions and associated with a first reference symbol and a second portion of said message is allocated to a second region of said plurality of regions and associated with a second reference symbol, wherein a third portion of said message is allocated to a third region of said plurality of regions, wherein said third portion of said message is associated with a third reference symbol, wherein orthogonal cover codes are applied to said first and third reference symbols, wherein said first and third reference symbols are allocated to the same resource element; and
- estimating a first channel corresponding to a first antenna port of said plurality of antenna ports using said first reference symbol;
- estimating a second channel corresponding to a second antenna port of said plurality of antenna ports using said second reference symbol; and
- demodulating at least one of said first and second portions of said message, wherein said portion is a control message and said first reference symbol is a user equipment (UE) specific reference symbol,
  wherein said first reference symbol is uniquely associated with said communication device.

25. The method of claim 24, wherein said control message includes commands related to one or more of power control, scheduling information, acknowledgment/negative acknowledgment (ACK/NACK) response and system information.

26. The method of claim 24, wherein said control message is a control channel element (CCE) and said first portion is a first part of said CCE and received from said first antenna port and said second portion is a second part of the same CCE and received from said second antenna port.

27. A communication device operable in a communication network to receive a message in a resource block, which includes a plurality of regions that comprise resource elements, from a base station with a plurality of antenna ports, comprising:
- one or more antennas configured to receive said message; and
- a processor coupled to said one or more antennas;
  wherein a first portion of said message is allocated to a first region of said plurality of regions and is associated with a first reference symbol and a second portion of said message is allocated to a second region of said plurality of regions and is associated with a second reference symbol, said first portion is a control message said first reference symbol is a user equipment (UE) specific reference symbol, wherein a third portion of said message is allocated to a third region of said plurality of regions, wherein said third portion of said message is associated with a third reference symbol, wherein orthogonal cover codes are applied to said first and third reference symbols, wherein said first and third reference symbols are allocated to the same resource element, and said processor is configured to:
- estimate a first channel of said communication network corresponding to a first antenna port of said plurality of base station antenna ports using said first reference symbol;
- estimate a second channel of said communication network corresponding to a second antenna port of said plurality of base station antenna ports using said second reference symbol; and
- demodulate at least one of said first and second portions of the message,
  wherein said first reference symbol is uniquely associated with said communication device.

28. The device of claim 27, wherein said control message includes commands related to one or more of power control, scheduling information, acknowledgment/negative acknowledgment (ACK/NACK) response and system information.

29. The method of claim 27, wherein said control message is a control channel element (CCE) and said first portion is a first part of said CCE and received from said first antenna port and said second portion is a second part of the same CCE and received from said second antenna port.

* * * * *

UNITED STATES PATENT AND TRADEMARK OFFICE
CERTIFICATE OF CORRECTION

PATENT NO. : 9,900,131 B2
APPLICATION NO. : 13/430865
DATED : February 20, 2018
INVENTOR(S) : Koorapaty et al.

It is certified that error appears in the above-identified patent and that said Letters Patent is hereby corrected as shown below:

In the Claims

In Column 16, Line 52, in Claim 17, delete "device" and insert -- base station device --, therefor.

In Column 16, Line 58, in Claim 18, delete "device" and insert -- base station device --, therefor.

In Column 16, Line 63, in Claim 19, delete "device" and insert -- base station device --, therefor.

In Column 16, Line 65, in Claim 20, delete "device" and insert -- base station device --, therefor.

In Column 17, Line 1, in Claim 21, delete "device" and insert -- base station device --, therefor.

Signed and Sealed this
Seventeenth Day of July, 2018

Andrei Iancu
*Director of the United States Patent and Trademark Office*